US007608797B2

(12) United States Patent
Belashchenko et al.

(10) Patent No.: US 7,608,797 B2
(45) Date of Patent: Oct. 27, 2009

(54) HIGH VELOCITY THERMAL SPRAY APPARATUS

(76) Inventors: Vladimir Belashchenko, 9 Irving Dr., Concord, NH (US) 03301; Andrei Voronetski, 91-h Oktjabrskaja Street, Moscow 127521 (RU)

( * ) Notice: Subject to any disclaimer, the term of this patent is extended or adjusted under 35 U.S.C. 154(b) by 112 days.

(21) Appl. No.: 11/158,314

(22) Filed: Jun. 21, 2005

(65) Prior Publication Data

US 2006/0037533 A1 Feb. 23, 2006

Related U.S. Application Data

(60) Provisional application No. 60/581,989, filed on Jun. 22, 2004.

(51) Int. Cl.
*B23K 10/00* (2006.01)

(52) U.S. Cl. .............................. 219/121.47; 219/121.5; 219/121.36; 427/446

(58) Field of Classification Search ... 219/76.15-76.17, 219/121.47, 121.48, 151.5, 121.51, 121.55, 219/121.5; 427/446, 448, 535, 569
See application file for complete search history.

(56) References Cited

U.S. PATENT DOCUMENTS 3,441,215 A * 4/1969 Cape .......................... 239/85
3,583,633 A * 6/1971 Campargue .............. 239/589.1
3,865,173 A 2/1975 Rohrberg
4,311,897 A * 1/1982 Yerushalmy ............. 219/121.5
4,370,538 A 1/1983 Browning
4,521,666 A * 6/1985 Severance et al. ....... 219/121.59
4,531,043 A 7/1985 Zverina et al.
4,780,591 A 10/1988 Bernecki et al.
4,902,871 A 2/1990 Sanders et al.
4,916,273 A * 4/1990 Browning .............. 219/121.47
4,954,688 A * 9/1990 Winterfeldt .............. 219/121.5
5,014,915 A * 5/1991 Simm et al. ................... 239/79
5,019,429 A 5/1991 Moskowitz et al.
5,122,182 A * 6/1992 Dorfman et al. .............. 75/252

(Continued)

FOREIGN PATENT DOCUMENTS

RU 2026118 C1 5/1993

(Continued)

OTHER PUBLICATIONS

International Search Report and Written Opinion dated Feb. 23, 2007 issued in corresponding PCT patent application No. PCT/US05/22100.

(Continued)

*Primary Examiner*—Tu B Hoang
*Assistant Examiner*—Stephen J Ralis
(74) *Attorney, Agent, or Firm*—Grossman, Tucker, Perreault & Pfleger, PLLC

(57) ABSTRACT

A thermal spray apparatus is provided for thermal spraying a coating onto a substrate. The apparatus include a heating module for providing a stream of heated gas. The heating module is coupled to a forming module for controlling pressure and velocity characteristics of the stream of heated gas generated by the heating module. The thermal spray apparatus further includes a barrel capable of directing the stream of heated gas from the forming module. A powder injection module may be provided for introducing powder material into the stream of heated gas.

39 Claims, 21 Drawing Sheets

U.S. PATENT DOCUMENTS

| | | | | |
|---|---|---|---|---|
| 5,124,525 | A * | 6/1992 | Severance et al. | 219/121.5 |
| 5,177,338 | A | 1/1993 | Sakuragi | |
| 5,227,603 | A | 7/1993 | Doolette et al. | |
| 5,243,169 | A * | 9/1993 | Tateno et al. | 219/121.51 |
| 5,440,094 | A | 8/1995 | Zapletal | |
| 5,653,895 | A | 8/1997 | Shintani | |
| 5,834,066 | A * | 11/1998 | Kunzli et al. | 427/446 |
| 5,932,293 | A * | 8/1999 | Belashchenko et al. | 427/446 |
| 5,977,510 | A * | 11/1999 | Lindsay | 219/121.5 |
| 6,003,788 | A * | 12/1999 | Sedov | 239/397.5 |
| 6,086,922 | A | 7/2000 | Kuhne | |
| 6,096,992 | A * | 8/2000 | Severance, Jr. | 219/121.5 |
| 6,156,995 | A * | 12/2000 | Severance, Jr. | 219/121.5 |
| 6,288,363 | B1 | 9/2001 | Kaga et al. | |
| 6,322,856 | B1 | 11/2001 | Hislop | |
| 7,067,170 | B2 * | 6/2006 | Marcus et al. | 427/66 |
| 2002/0112794 | A1 | 8/2002 | Sethuram et al. | |
| 2004/0035838 | A1 | 2/2004 | Merard et al. | |
| 2004/0226508 | A1 | 11/2004 | Ma et al. | |
| 2005/0255419 | A1 * | 11/2005 | Belashchenko et al. | 431/278 |
| 2006/0037533 | A1 | 2/2006 | Belashchenko et al. | |
| 2006/0102598 | A1 | 5/2006 | Twarog et al. | |
| 2006/0108332 | A1 * | 5/2006 | Belashchenko | 219/121.47 |

FOREIGN PATENT DOCUMENTS

| | | | |
|---|---|---|---|
| RU | 2037336 | C1 | 6/1995 |
| RU | 2056231 | C1 | 3/1996 |

OTHER PUBLICATIONS

U.S. Appl. No. 10/997,800: Office Action Dated Sep. 8, 2006.

U.S. Appl. No. 10/997,800; Office Action Dated May 22, 2007.

U.S. Appl. No. 10/997,800; Office Action Dated Nov. 1, 2007.

The International Search Report and Written Opinion of the International Searching Authority issued on Mar. 20, 2006 in International Application No. PCT/US2005/042822 by ISA/US Examiner Jose Dees (12 pages).

* cited by examiner

D-D

HIGH VELOCITY THERMAL SPRAY APPARATUS

CROSS-REFERENCE TO RELATED APPLICATIONS

The present application claims the benefit of the filing date of U.S. Provisional Application Ser. No. 60/581,989 filed Jun. 22, 2004.

FIELD

The present disclosure is directed at a thermal spray apparatus and more particularly at a barrel and forming module for a thermal spray apparatus.

BACKGROUND

High velocity spraying processes based on combustion of oxygen-fuel mixtures (HVOF) or air-fuel mixtures (HVAF) allow coatings to be sprayed from variety of materials. HVOF and HVAF processes may generally produce sonic and supersonic gas jets including combustion products of the oxygen-fuel or air-fuel mixtures. High quality coatings can be sprayed at a high level of efficiency when the temperature of the combustion products is high enough to soften or melt the particles being sprayed and the velocity of the stream of combustion products is high enough to provide the required density and other coating properties. Different materials require different optimum temperatures of the sprayed particles in order to provide an efficient formation of high quality coatings. Higher melting point materials, such as cobalt and/or nickel based alloys, carbides and composite materials, may often require relatively high temperatures in order to soften the particles to a level sufficient to efficiently form high quality coatings.

Some of the parameters affecting the available range of temperatures and velocities available from the combustion products are combustion pressure, types of fuel and oxidizer and ratio of fuel/oxidizer flow rates. Commonly used fuels may include gaseous and liquid hydrocarbon fuels like propane, propylene, MAPP gas, kerosene. Hydrogen may also be used as a fuel. Liquid fuels may provide some advantages over gaseous fuels. The use of liquid fuels may be less expensive than gaseous fuels and may be more easily fed into combustion apparatus at high pressure by using pumps or pressurized tanks. Some of gaseous fuels, for example, propane, are supplied in tanks at relatively low pressure. A tank of a gaseous fuel at low pressure may require pre-heating in order to provide a spraying gun with high pressure gaseous fuel. The pre-heating isn't attractive from safety standpoint.

Combustion devices and other parts of combustion apparatus may require cooling because of high temperatures of combustion. Cooling, however, may result in heat losses from the combustion apparatus to the cooling media. This heat loss may be a factor that can affect the efficiency of the process, for example by influencing the temperature and velocity of a combustion jet. Heat losses may depend, at least in part, on the intensity of the cooling and the surface areas of the combustion apparatus that are being cooled by a cooling media.

According to some designs, compressed air or oxygen is fed through air passages surrounding the combustion chamber and the barrel/nozzle assembly in order to cool these parts. The compressed air is then fed from the passages into the combustion chamber and is used as an air supply for the combustion process. This "regenerative" heat exchange may be economical and may reduce heat losses from the combustion. Oxygen has a relatively low flow rate in comparison with air. Therefore, cooling using only oxygen may not be sufficient to prevent an HVOF system, which may generally operate at a higher temperature than an HVAF system, from overheating.

Oxygen/fuel mixtures may achieve high combustion temperatures, in some cases reaching temperatures of 3000 degrees C. or higher. To protect the apparatus from damage due to these extreme temperatures, water is commonly used as a cooling media for oxygen/fuel mixtures. In addition to the use of water cooling systems, combustion chambers for burning oxygen/fuel mixtures, as well as other components that will be exposed to high temperatures, are often manufactured from copper or copper alloys. Very efficient cooling may be achieved using water as a cooling medium in combination with copper or copper alloy components. Unfortunately, such efficient cooling may result in relatively large heat losses, especially in combustion systems having large internal surface areas and/or numerous turns in the path of combustion products.

SUMMARY

According to one embodiment consistent with the present invention, a thermal spray apparatus is provided including a heating module for providing a stream of heated gas. The thermal spray apparatus may further include a forming module coupled to the stream of heated gas. The forming module may include a first zone having an entrance coupled to the stream of heated gas and may have an exit coupled to a throat. The throat may be provided having a constant cross-sectional area. The forming module may further include a second zone having an entrance coupled to said throat and an exit. A barrel may be provided coupled to the exit of the forming module. The thermal spray apparatus may also include a powder injection module including at least one powder injector for introducing powder material into the stream of gas. Additionally, the thermal spray apparatus may include a shockwave generator. The ratio between the cross-sectional area of the exit of the second zone and the cross-sectional area of the throat $=Kn^2(1.7+0.1\ Pcc/Pa)^2$, where Pcc is absolute pressure in the heating module, Pa is atmospheric pressure, and Kn is in the range of between about 0.5 to about 0.8.

According to another embodiment, a thermal spray apparatus is provided including a forming module. The forming module may include at least two sub-forming blocks, with each of the sub-forming blocks being coupled to a gas stream. Each of the sub-forming blocks may include a converging zone having an inlet diameter that is greater exit diameter, a throat having a constant cross-sectional area, and an expansion zone having an exit diameter that is greater than an inlet diameter. The thermal spray apparatus may further include a barrel coupled to an exit of each sub-forming block.

According to yet another embodiment, a thermal spray apparatus is provided including a forming module coupled to a stream of gas. The forming module may include a converging zone having an entrance and an exit, in which the entrance has a greater cross-sectional area the exit. The forming module may also include a throat having a constant cross-sectional area. The throat may be coupled to the exit of the converging zone. The forming module may further include an expansion zone having an entrance and an exit, with the entrance having a cross-sectional area smaller than the cross-sectional area of the exit. The entrance of the expansion zone may be coupled to the throat. The thermal spray apparatus may further include a powder injector for introducing a powder material into the stream of gas. The powder injector may be oriented parallel to an axis of the forming module and may be disposed at least partially within the forming module. The powder injector may have a cross-sectional profile that at least partially defines the cross-sectional areas of at least one of the converging zone, the throat, or the expansion zone.

BRIEF DESCRIPTION OF DRAWINGS

Features and advantages of the claimed subject matter will be apparent from the following description of embodiments consistent therewith, which description should be considered in conjunction with the accompanying drawings, wherein:

DESCRIPTION

As an overview, the present disclosure may generally provide a high velocity thermal spray (HVTS) apparatus. The HVTS apparatus may be provided including a first module providing a heating module that may provide high temperature, high pressure gases. According to one embodiment, the heating module may operate at a pressure Pcc greater than about 4 bar to 5 bar (0.4-0.5 MPa), and may provide gases having a temperature Tcc at the outlet of the heating module. A second module of the HVTS apparatus may be configured as a forming module which may form the stream of gasses from the heating module. That is, the forming module may control the pressure and/or velocity profiles of the gases from the heating module. According to one embodiment the forming module may accelerate the gases from the heating module to provide a sonic or supersonic jet of gas. A third module may include a powder feeding module which may feed a powder to be sprayed by the HVTS apparatus into the gases produced in the heating module. A fourth module may serve as a barrel in which the powder may be accelerated and heated by the gases from the heating module. There may be a shock wave generator which may be provided by the forming module, the barrel, and or the transition between the forming module and the barrel. The modular design approach of the HVTS apparatus may allow separate modules to be provided having desired performance characteristics. The separate modules may be assembled to provide desired performance parameters for the HVTS apparatus as a whole. The separate modules may be provided, for example, to provide a desired performance for use with a particular heating module design, spraying materials and/or requirement of coatings to be sprayed. Thus the system may provide different modules allowing a desired performance to be achieved for different conditions. According to one embodiment, the heating module of HVTS apparatus may be provided as an oxidizer-fuel combustion module. According to another embodiment, the heating module of HVTS apparatus may be provided as a plasma torch. According to yet another embodiment, the heating module of HVTS apparatus may be provided as a resistance heater. Other configurations may also may achieved consistent with the present disclosure.

Figure 1:
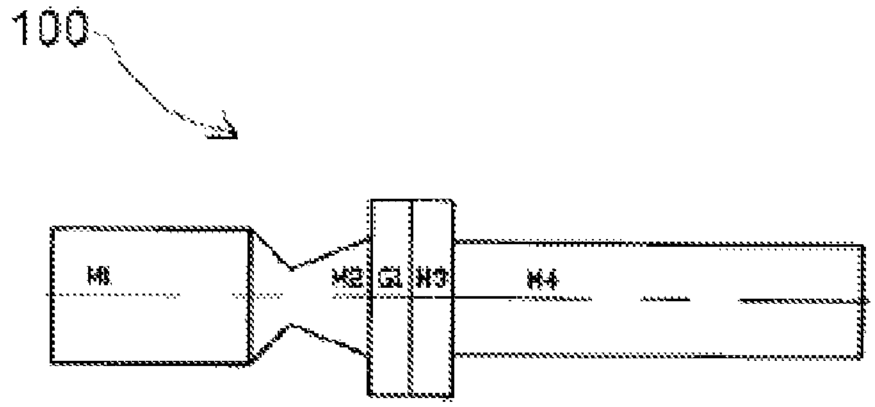
FIG. 1 is a schematic illustration of the an embodiment of an HVTS apparatus consistent with the present disclosure.

Referring to FIG. 1, an HVTS apparatus 100 is schematically illustrated including a heating module M1, a forming module M2, a powder feeding module M3, a barrel module M4. A shock wave generator G1 may be provided as part of the forming module M2, the barrel module M4, or may be provided in or by a transition between the forming module M2 and the barrel module M4. While an apparatus herein may generally be referred to as an HVTS apparatus, the apparatus may be configured as a HVOF (high velocity oxidizer-fuel)

apparatus, a high velocity high pressure plasma apparatus, and/or similar systems producing an output including a stream of heated gaseous products. While the HVTS apparatus 100 is schematically delineated in to four modules M1, M2, M3, M4 and the shock wave generator G1 the HVTS apparatus 100 may include additional features or modules. Additionally, it is not necessary with the present disclosure that the four modules M1, M2, M3, M4 and the shock wave generator G1 are physically discrete or separable components. According to one embodiment herein, the heating module M1 may be capable of operating at pressures (Pcc) greater than between about 4 to about 5 bars (0.4-0.5 MPa) and may produce gases having a temperature Tcc, measured at the exit of the heating module M1.

Figure 2:
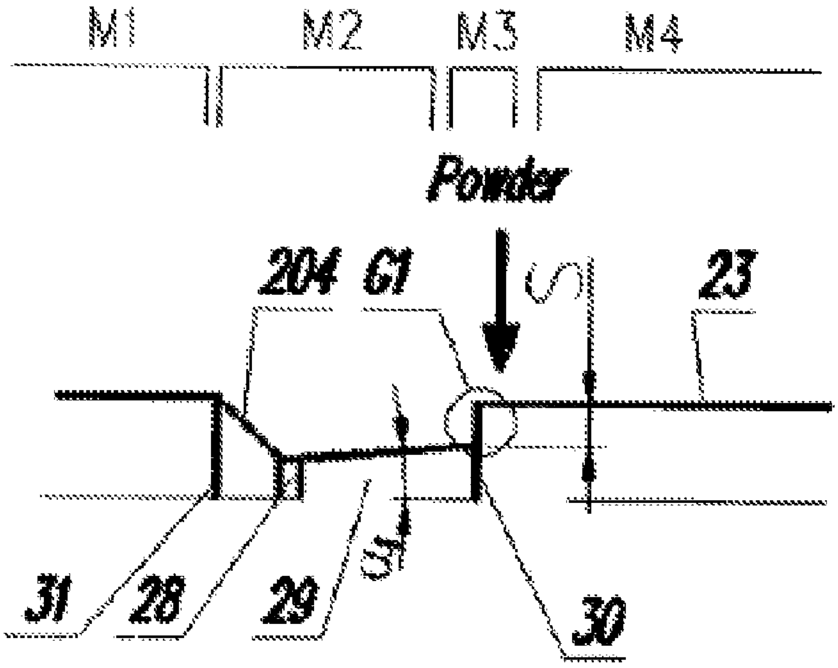
FIG. 2 is a schematic view of an embodiment of an exit of a forming module and an entrance of a barrel module according to the present disclosure.

Referring first to FIG. 2, a schematic profile of a forming module M2 and barrel module M3 that may suitably be used in combination with the heating module M1 herein is shown. The illustrated modules may include several zones that may form, i.e., influence or control velocity and pressure profiles, etc., a flow, or stream, of heated gases exiting a heating module. From the heating module exit 31, the gas passage may include a converging zone 204 in which the diameter of the gas passage is reduced. The converging zone 204 may terminate in a throat or orifice 28. From the throat 28, the diameter of the gas passage may increase through an expansion zone 29. The increasing diameter of the gas passage in the expansion zone 29 may cause the stream of gas may accelerate. In some embodiments, the stream of gas accelerated through the expansion zone may achieve supersonic velocity. According to one embodiment, the expansion zone 29 may provide a gas pressure that is less than atmospheric at the exit of the expansion zone/entrance of the barrel 30. The exit of the expansion zone 29 may have a diameter Dne and a surface area Sne related to the diameter Sne.

Shock waves may be generated in the stream of gas as it flows through the barrel 23 of the HVTS apparatus 100. The shock waves in the stream of gas may improve the thermal exchange between the heated gas and spraying particles that may be introduced into the stream of gas. Additionally, shock waves in the stream of gas may concentrate spraying particles in the gas stream around the axis of the gas passage. Concentrating particles closer to the axis of the gas stream may reduce the occurrence of build up of particles on the barrel wall 23. Furthermore, concentrating particles along the axis of the gas stream may produce high exit velocities of the particles, which may, for example, increase the density of a sprayed coating. According to one embodiment, shock waves may be generated in the stream of gas by changing the profile of the gas passage. Consistent with the embodiment depicted in FIG. 2, shock waves may be generated in the stream of gas by providing a step inside the gas passage. In the illustrated embodiment, the diameter Dne, and corresponding surface area Sne, of the gas passage at the exit 30 of the expansion zone 29 are less than the diameter Dbl, and corresponding surface area Sbl, of the gas passage at the entrance 30 of the barrel 23. The ratio between the surface area Sbl of the entrance 30 of the barrel 23 and the surface area Sne of the exit 30 of the expansion zone 29, i.e., Sbl/Sne, may be provide in the range of between about 1.05 to about 1.7. In a particular embodiment, the ratio Sbl/Sne may be in the range of between about 1.1 to about 1.6. Consistent with the embodiment illustrated by FIG. 2, the dimension S of the step formed between the expansion zone 29 and the barrel 23 is such that Sbl>Sne.

Figure 3A:
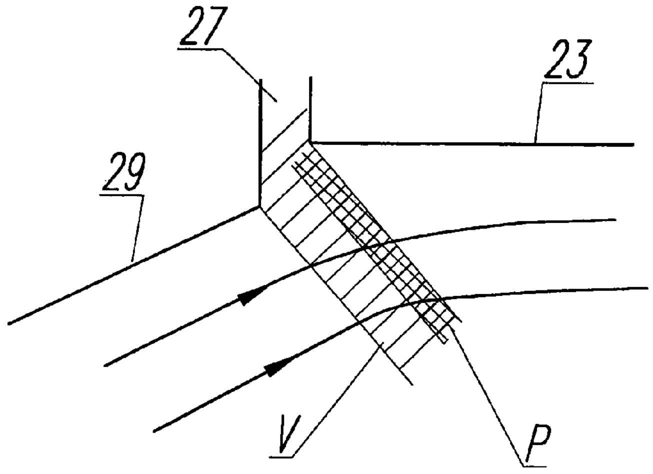
FIG. 3*a* is a schematic representation of a shock wave and a low pressure zone associated with an embodiment of an HVTS apparatus consistent with the present disclosure.
Figure 3B:
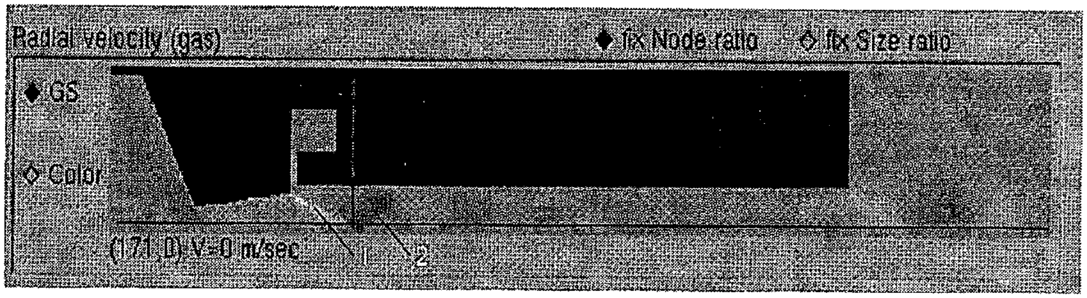
FIG. 3*b* is a computer modeled illustration of the gas flow and shock waves schematically depicted in FIG. 3*a;*

Consistent with this embodiment, the step S may generate a shock wave having high and low pressure zones along the barrel, as illustrated in by FIGS. 3*a* and 3*b*. As shown in FIG. 3*a*, the position of the low pressure zone V and the high pressure zone P in the region of the step. FIG. 3*b* shows a computer generated representation of the general structure of a shock wave along the gas channel of a barrel 23 at a location downstream of the step. According to one embodiment, a powder to be sprayed by HVTS apparatus may be introduced into the gas stream at the lower pressure region V, indicated in FIG. 3*a*.

The intensity of a shock wave generated by a given passage geometry and step size may be at least partially dependent upon the gas velocity or Mach number. The gas velocity itself may be at least partially dependent upon the heating module pressure and the expansion ratio, θ=Dne/Dt, wherein Dne is the diameter of the gas passage at the exit 30 of the expansion zone 29 and Dt is the diameter of the throat 28. The expansion ratio may also be expressed as θs=Sne/St, wherein Sne is the surface area of the gas passage at exit 30 of the expansion zone 29 and St is the surface area of the throat 28. A higher expansion ratio may produce shock waves of greater intensity. However, increasing the expansion ratio may decrease the temperature of the heated gas stream. These characteristics may be varied to achieve shock waves having a desired intensity while still maintaining a sufficient temperature of the gas stream.

The expansion ratio may be determined according to the formula: θ=Kn (1.7+0.1 Pcc/Pa), in which Pcc is absolute pressure in the heating module, Pa is atmospheric pressure, and Kn is a coefficient determined through experimentation and modeling. Similarly, $\theta s = Kn^2\ (1.7+0.1\ Pcc/Pa)^2$. According to one embodiment, the coefficient Kn may generally be in the range of between about 0.5 to 0.8. In further embodiments, the coefficient Kn may be in the range of between about 0.6 to 0.75. Furthermore, if Pcc is the surplus pressure, then θ=Kn(1.7+0.1(Pcc/Pa+1)). Using this formula, according to an embodiment in which the coefficient Kn is in the range of between about 0.6-0.75 and in which the absolute heating module pressure Pcc=0.9 MPa, the expansion ratio θ may be in the range of between about 1.56-1.95. In an embodiment in which the absolute pressure in the heating module is about 1.3 MPa, the expansion ratio may be in the range of between about 1.8-2.25. Consistent with these general expansion ratios, the angle α1 of the expansion zone 29, shown in FIG. 2, may be about 3-10 degrees.

Figure 4:
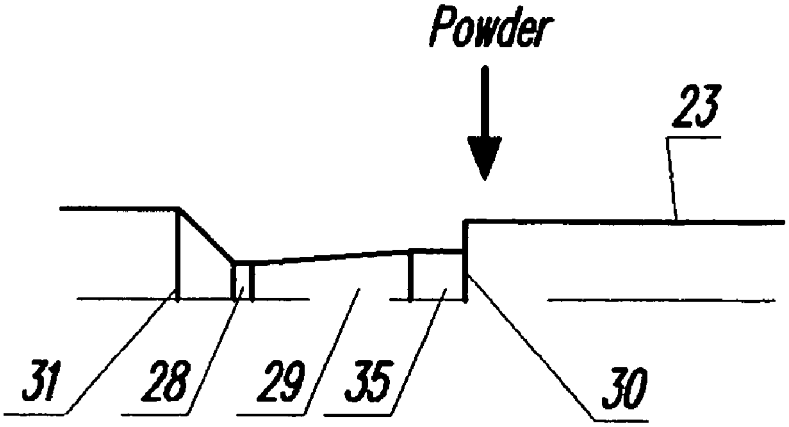
FIG. 4 schematically illustrates an embodiment of a forming module exit consistent with the present disclosure including a cylindrical portion.

The velocity of the gas stream through the expansion zone 29 may include radial components that are directed away from the axis of the gas passage. In some embodiments, these radial velocity components may be disadvantageous for the injection of powder into the gas stream. Turning to FIG. 4, according to one embodiment, the radial component of the gas velocity may be minimized in the region of powder introduction by providing a cylindrical exit portion 35 between the expansion zone 29 and the barrel 23. The length of the cylindrical zone 35 may generally be in the range of between about 0.25 to 2 times the diameter of the exit of the expansion zone 29, in some embodiments the length of the cylindrical zone 35 may be in the range of between about 0.5 to 1.5 time the diameter of the exit of the expansion zone 29. Consistent with this embodiment, the length of the expansion zone 29 may be decreased by increasing the expansion angle α1, discussed with reference to FIG. 2, while still maintaining the radial component of the velocity of the gas stream within a desired range allowing introduction of powder into the gas stream. Increasing the expansion angle, and thereby decreasing the length of the expansion region 29, may allow heat losses in the expansion zone 29 to be reduced. According to one embodiment utilizing a cylindrical exit region 35, the expansion angle α1 may be increase to an angle of about 15 degrees. The expansion angle may be varied depending upon the desired level of radial gas stream velocity components, as well as the length and diameter of the cylindrical exit region 35.

Figure 5:
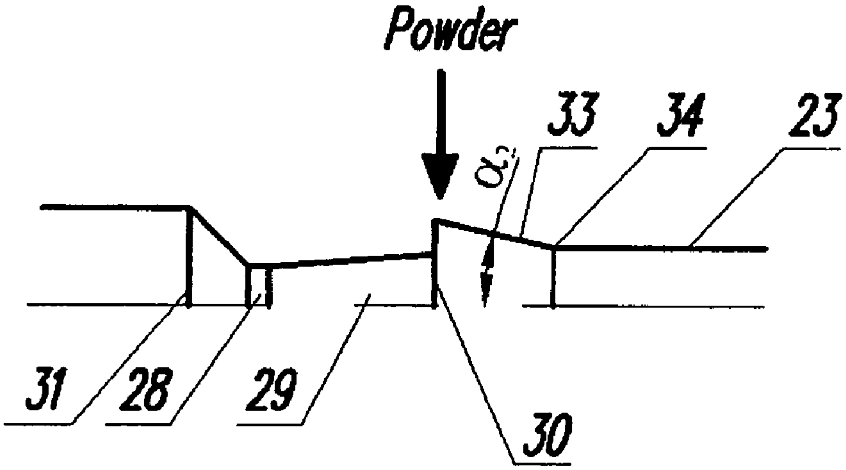
FIG. 5 schematically depicts a gas passage in an HVTS apparatus including a converging zone according to the present disclosure.

Referring to FIG. 5, another embodiment for reducing any undesired effects of radial outward components of a gas stream velocity is shown. In the illustrated embodiment, expansion zone 29 may have an expanding conical geometry, and may have an exit 30 into the barrel 23. The barrel 23 may include a converging zone 33 at the entrance 30 of the barrel 23. The converging zone 33 may provide an inwardly directed radial component to the gas stream velocity. The radial inward component of the gas stream velocity provided by the converging zone 33 may direct powder particles towards the axis of the gas passage. Directing powder particles toward the axis of the gas passage may reduce an accumulation of powder particles on the interior wall of the barrel 23. Furthermore, the transition 34 between the converging zone 33 and the cylindrical barrel 23 may also create additional shock waves that may also direct powder particles toward the axis of the gas passage. Such additional shock waves may, therefore, also reduce the accumulation of powder on the interior wall of the barrel 23.

According to one embodiment including a converging zone, the length of the converging zone 33 may be in the range of between about 0.25 to 2.0 times the diameter of the exit of the expansion zone, Dne. In a further embodiment, the length of the converging zone 33 may be in the range of between about 0.5 to about 1.5 the diameter of the exit of the expansion zone, Dne. The converging zone 33 may have a converging angle of between about 1 to 10 degrees relative to the axis of the barrel 23, and according to one embodiment an angle of between about 3 to 8 degrees relative to the axis of the barrel 23. The step size between the expansion zone 29 and the entrance 30 of the converging zone 33 of the barrel 23 and the length of the converging zone 33 may be determined at least in part on the exit diameter of the barrel. According to one embodiment, the barrel 23 may have an exit diameter that is in the range of between about 0.5 to 1.5 times the exit diameter of the expansion zone, Dne. According to a further embodiment, the exit diameter of the cylindrical part of the barrel 23 may be in the range of between about 0.75 to about 1.25 times the exit diameter of the expansion zone, Dne.

According to one variation, the barrel 23 may be provided having a cylindrical zone at the entrance thereof 30. Following the cylindrical zone, the barrel 23 may include the converging zone 33. As with the preceding embodiment, the converging zone 33 may have a transition 34 into a cylindrical region of the barrel 23 leading to the exit thereof. Consistent with one such embodiment, the cylindrical region between the entrance 30 of the barrel and the converging zone 33 may have a length that is in the range of between about 0.25 to about 1.25 times the exit diameter of the expansion zone, Dne. In another embodiment, the cylindrical region between the entrance 30 and converging zone 33 may have a length that is in the range of between about 0.5 to about 1 times the exit diameter of the expansion zone, Dne.

Figure 6:
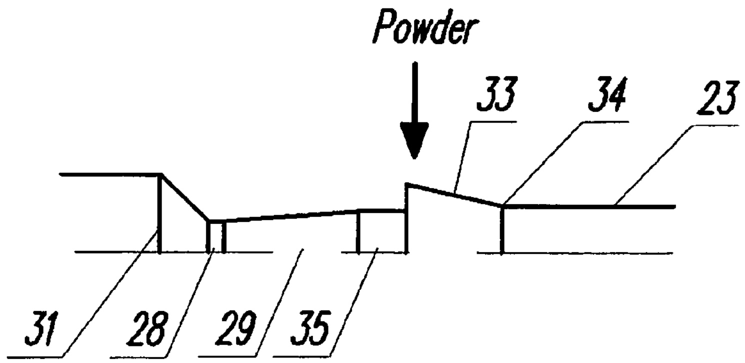
FIG. 6 is a schematic illustration of an embodiment showing a forming modeling according to the present disclosure including a cylindrical exit portion, and a portion of a barrel of an HVTS apparatus according to the present disclosure including a converging zone.

Referring to FIG. 6, an embodiment of a gas forming module M2 combining the use of a cylindrical exit region 35 of the expansion zone 29 with a converging entrance region 33 of the barrel 23. Consistent with the illustrated embodiment, it may be possible to minimize a radial component of the gas stream velocity to a desired level, and to reduce the length of the expansion zone 29. Accordingly, it may be possible to reduce heat losses in the expansion zone 29 and to reduce accumulation of powder on the inside wall of the barrel 23.

Figure 7:
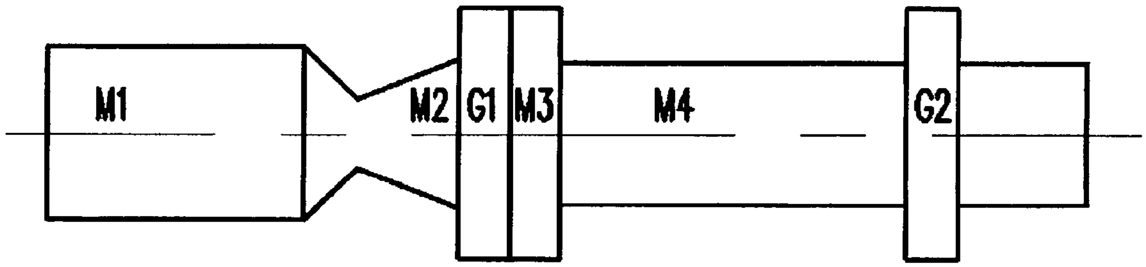
FIG. 7 is a schematic illustration of the an embodiment of an HVTS apparatus consistent with the present disclosure including a second shock waves generator.
Figure 8A:
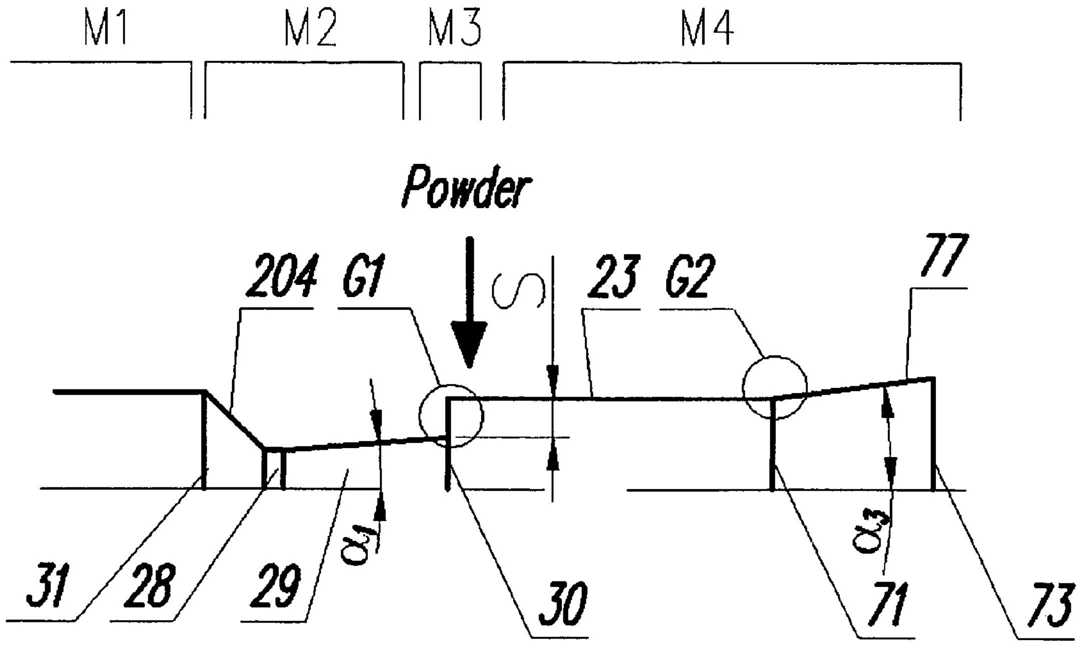
FIG. 8*a* schematically depicts an embodiment of a second shock wave generator of an HVTS apparatus.

Referring to FIG. 7 the barrel 23 may be provided having a second shock wave generator G2 located downstream from the first shock wave generator G1. The downstream shock wave generator G2 may also act to concentrate spraying particles in the gas stream around the axis of the gas passage. Concentrating the particles closer to the axis of the gas stream may reduce or eliminate the occurrence of build up of particles on the barrel wall at the barrel exit. According to one embodiment, the downstream shock wave generator G2 may include a barrel expansion 77 located down stream of the barrel entrance 30. The barrel expansion 77 may be formed by an outwardly flared region of the barrel having an angle α3 between the cylindrical part of the barrel 23 and a barrel expansion 77, as illustrated by FIG. 8*a*. The angle α3 defining the barrel expansion 77 may be selected to provide a ratio of the diameter of the barrel expansion exit to the barrel expansion entrance in the range of between about 1.02 to about 1.3. According to one embodiment, the angle α3 may be selected to provide a ratio of the diameter of the barrel expansion exit to the diameter of the barrel expansion entrance in the range of between about 1.05 to about 1.25. The angle α3 may further be dependent upon the length of the barrel expansion 77 which may generally be in the range of between about 0.05 Lb to about 0.25 Lb, wherein Lb is the total length of the barrel.

Figure 8B:
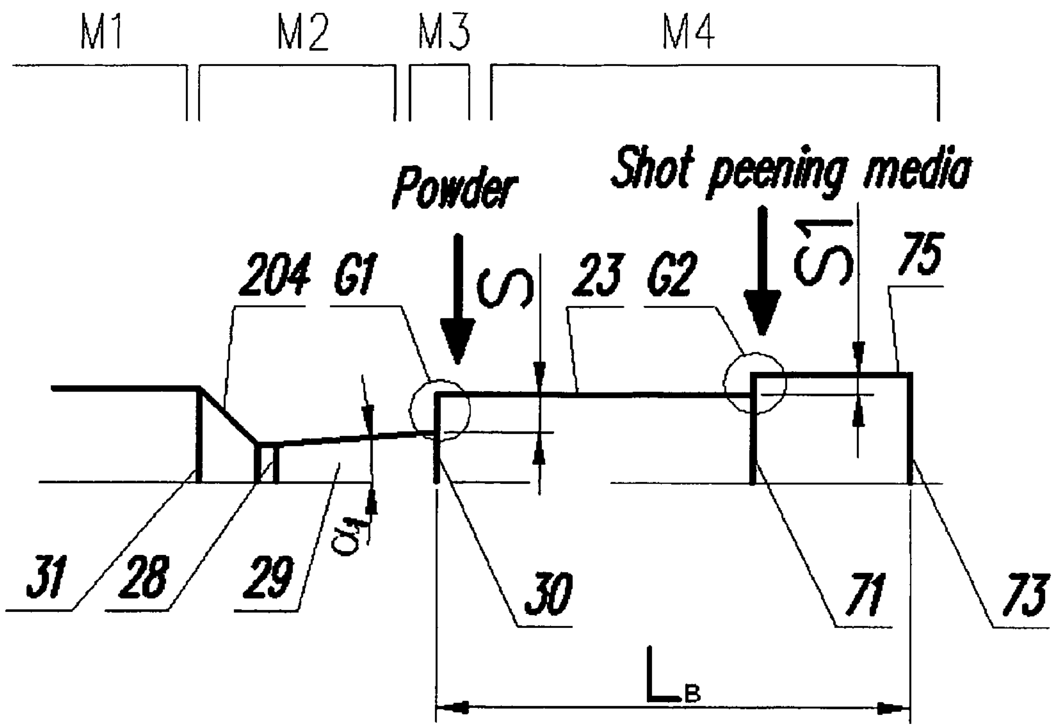
FIG. 8*b* is a schematic view of another embodiment of second shock wave generator of an HVTS apparatus.

According to another embodiment, a secondary shock wave may be generated in the stream of gas by providing a secondary step S1 inside the gas passage, as illustrated in FIG. 8*b*. As shown, the diameter Db1 of the entrance of the gas passage inside the barrel 23 is less than the diameter Db2 of the exit gas passage 73 of the barrel 23. The ratio between the diameter Db2 of the exit gas passage 73 of the barrel 23 and the diameter Db1 of the entrance of the barrel 23, i.e., Db2/Db1, may be provide in the range of between about 1.02 to 1.3. In a particular embodiment, the ratio Db2/Db1 may be in the range of between about 1.05 to 1.25. Accordingly, the dimension S1 of the step formed between the barrel exit 73 and entrance of the barrel 23 is such that Db2>Db1.

According to one embodiment, the low pressure zone created by the down stream generator G2 may be suitable for the additional feeding of lower melting point powder or shot peening media, as indicated in FIG. 8*b*. A distance between the barrel exit and a position of the shock wave generator G2 may be in the range of between about 0.05 Lb to about 0.25 Lb where Lb is the barrel length. The downstream shock wave generator G2 may have some or all of the features described above regarding the first shock wave generator G1 described with reference to FIGS. 4-6.

Figure 9A:
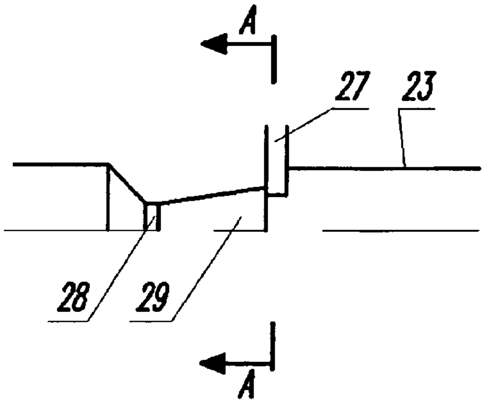
FIG. 9*a* schematically illustrates an embodiment of a powder injection region of a gas passage.
Figure 9B:
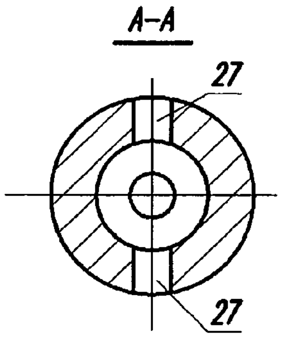
FIG. 9*b* is a sectional view of the embodiment of a powder injection region of a gas passage illustrated in FIG. 9*a* taken along section line A-A.

Turning next to FIGS. 9*a* and 9*b*, an embodiment of a powder injection region is shown. Powder injectors may be oriented tangential, i.e. in a radial direction, to the axis of the gas stream. As discussed above, shock waves generated in the gas stream may generate a series of low pressure zones and high pressure zones along the barrel. One of the parameters involving the injection or introduction of powder into the gas stream may be the velocity of powder injection. The injection velocity of powder into the gas stream, measured in a direction radial to the flow of the gas stream, and the injection position of powder may be influenced by the pressure in the powder injection zone Ppi. According to one embodiment, the powder material may be introduced into the gas stream at a low pressure zone. Furthermore, according to the illustrated embodiment, powder may be introduced into the gas stream at a location that is close the axis of the gas stream.

In the illustrated embodiment, powder may be introduced into the gas stream generally at the transition between the expansion zone 29 and the barrel 23. As shown, a passage 27, injection nozzle, etc. may be used for introducing a powder into the gas stream. The powder may be delivered through the passage 27 using a carrier gas. The passages 27 may be provided having a variety of configurations or geometries. For example, the passages 27 may be configured as cylindrical openings, or may be configured as slotted injectors, which may allow improved control of powder injection and positioning of the injected particles inside the barrel 23. Introducing the powder into a low pressure region of the gas stream may reduce the flow rate of a carrier gas required to inject the powder into a desired position within the gas stream. Reducing the flow rate of the carrier gas in this manner may also reduce the amount of cooling of the hot gas stream that is caused by the relatively cooler carrier gas. For example, the flow rate of a carrier gas used to inject a powder into a powder injection zone in which the Ppi is about 0.15 MPa is approximately 2.5 times greater than the carrier gas flow rate necessary to achieve the same injection conditions in a powder injection zone in which the Ppi is about 0.05 MPa. According to one embodiment, the pressure in the powder injection zone may be in the range of between about 0.04 to 0.08 MPa, although injection may also suitably take place at locations exhibiting higher or lower pressures.

According to one embodiment, a powder injection zone for an HVTS torch may have an additional passage connected to a pressure sensor. Pressure in the powder injection zone (Pi) may be used for monitoring barrel conditions. Generally, an increase in the Pi during spraying may indicate that there may be some problems in the powder feeding passage or of the beginnings of build up inside the barrel. There may be a critical difference (Δ) between a starting pressure in the injection zone (Psi) and an increased pressure (Pi), at which the spraying should be stopped in order to prevent build up inside the barrel to a degree at which the coating quality may be compromised. The difference Δ=Pi−Psi may be determined experimentally for a particular design and geometry of a barrel.

While the illustrated embodiment shows powder injection occurring at the low pressure zone associated with a step between the expansion zone 29 and the barrel 23, powder injection may also, or alternatively, be carried out at any low pressure zone located in the gas stream channel. In addition to providing powder injection at a low pressure zone, powder injection may be carried out at a region of high shock wave intensity. Powder injection at a region of high shock wave intensity may make it possible to take advantage of the enhanced thermal exchange between the heated gases and the powder. The injection of powder into a region of high shock wave intensity, however, is not necessary.

Consistent with the present disclosure, the low pressure zones created by the shock wave generator G1 and or the low pressure zone created by the second shock wave generator G2 may also advantageously be employed to control the gas stream temperature and/or velocity. According to one embodiment consistent with this aspect, various gases may be introduced into the gas stream in the low pressure zones. For example, the apparatus may include passages coupled located at, or adjacent, the low pressure zones for introducing gases that may be used to modify the temperature and/or velocity of the gas stream. Gases such as nitrogen, air, carbon dioxide, etc., may be introduced into the gas stream to decrease the temperature of the gas stream. Combustible gases, or even liquids, including, for example, acetylene, propane, propylene, etc. may be introduced into the gas stream at the low pressure zones in order to increase the temperature of the gas stream. According to one embodiment, an oxidizer rich mixture may be used in a combustion-type heating module M1, thereby providing residual free oxidizer that may be used for combusting the hydrocarbon gases. In another embodiment, oxidizer may be supplied directly to the low pressure zones, either through the passages used to supply combustible gases to the low pressure zones or through separate passages.

Consistent with one such embodiment, acetylene may be used to provide very high combustion temperatures of around 3100° C. when combusted with oxygen, and combustion temperatures of around 2600° C. when combusted with air, for heating the gas stream. Acetylene may not generally provide a desirable fuel to be used in a combustion-type heating module M1 due to the safety concerns arising from the combustion chamber pressures in the range of about 4-5 bars (0.4-0.5 MPa). However, the pressure in the low pressure zones created by the shock wave generators may be sufficiently low to allow acetylene to be safely used for heating the gas stream.

FIGS. 10a-d illustrate embodiments of an HVTS apparatus utilizing axial injection of powder into a low pressure zone. Axial powder injection may, in some embodiments, provide advantages related to an improved concentration of powder in the central zone of the gas stream and may produce increased homogeneity of the powder treatment. However, axial powder injection may subject the powder injector to greater temperatures that may, in some instances, pose a tendency to overheating of the powder injector. For this reason, it may be desirable to operate a lower gas stream temperature as compared with maximum suitable gas stream temperatures employed with radial or tangential injection systems.

Figure 10A:
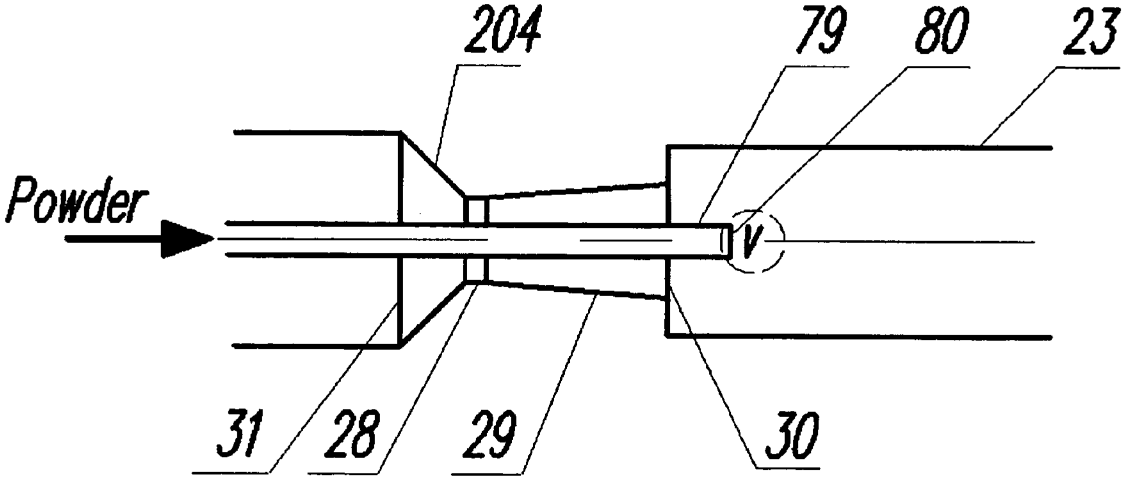
FIG. 10*a* illustrates an embodiment of an HVTS including an axial powder injector that may suitably be employed consistent with the present disclosure.

FIG. 10a schematically illustrates an embodiment in which an axial powder injector 79 may extend through the throat 28 and expansion zone 29 into the barrel 23. The powder injector exit may be located in the low pressure zone V, thereby providing direct powder delivery along the axis of the gas stream and into a low pressure zone. Direct delivery of powder into a low pressure zone may allow a lower carrier gas flow rate and/or pressure to be used, as discussed above. Additionally, as mentioned above axial powder delivery may provide greater concentration of the powder in a central region of the gas stream and may reduce build up of powder on the wall of the barrel 23.

Figure 10B:
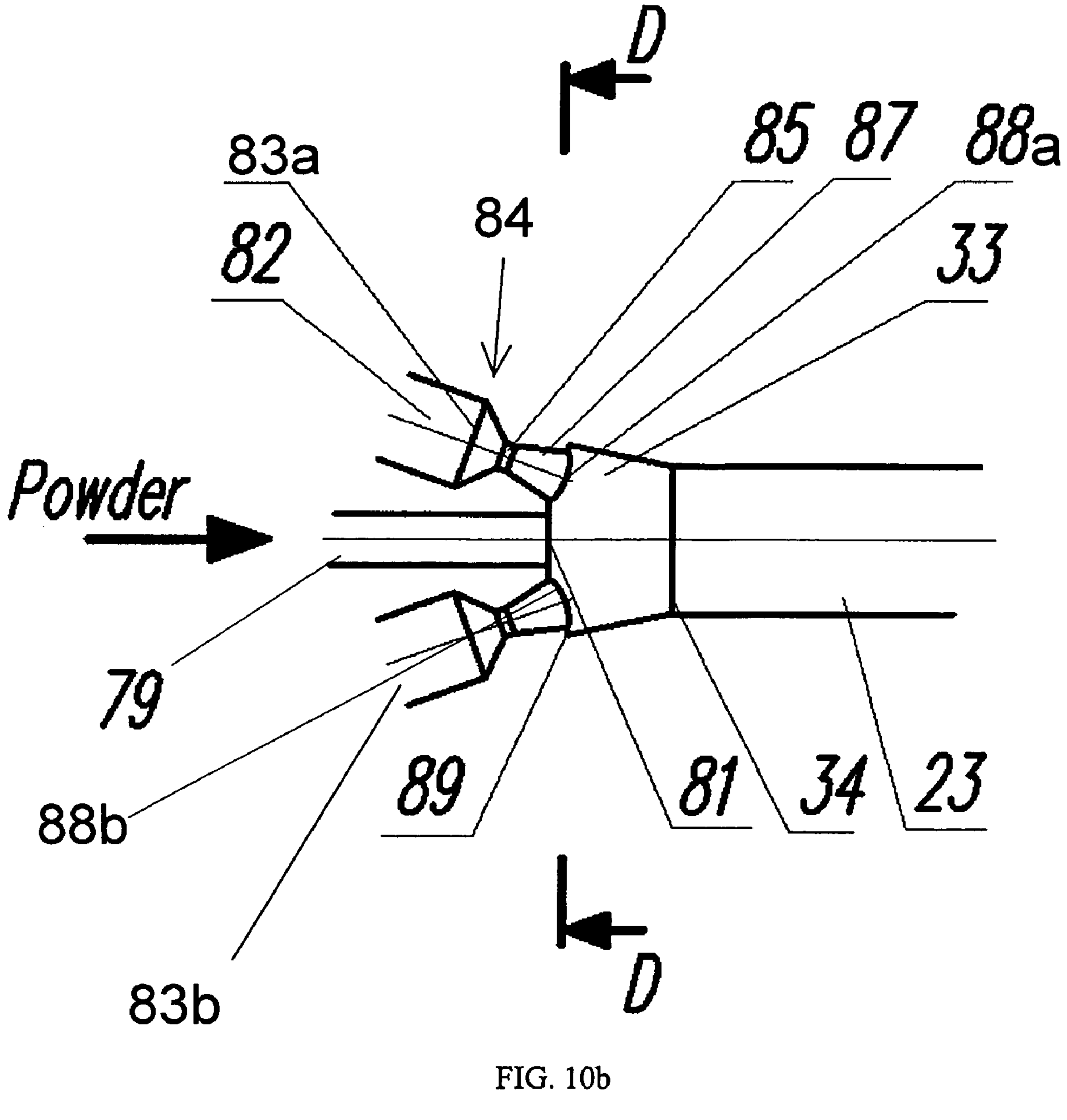
FIG. 10*b* schematically illustrates an embodiment of a forming block including sub-forming blocks.
Figure 10C:
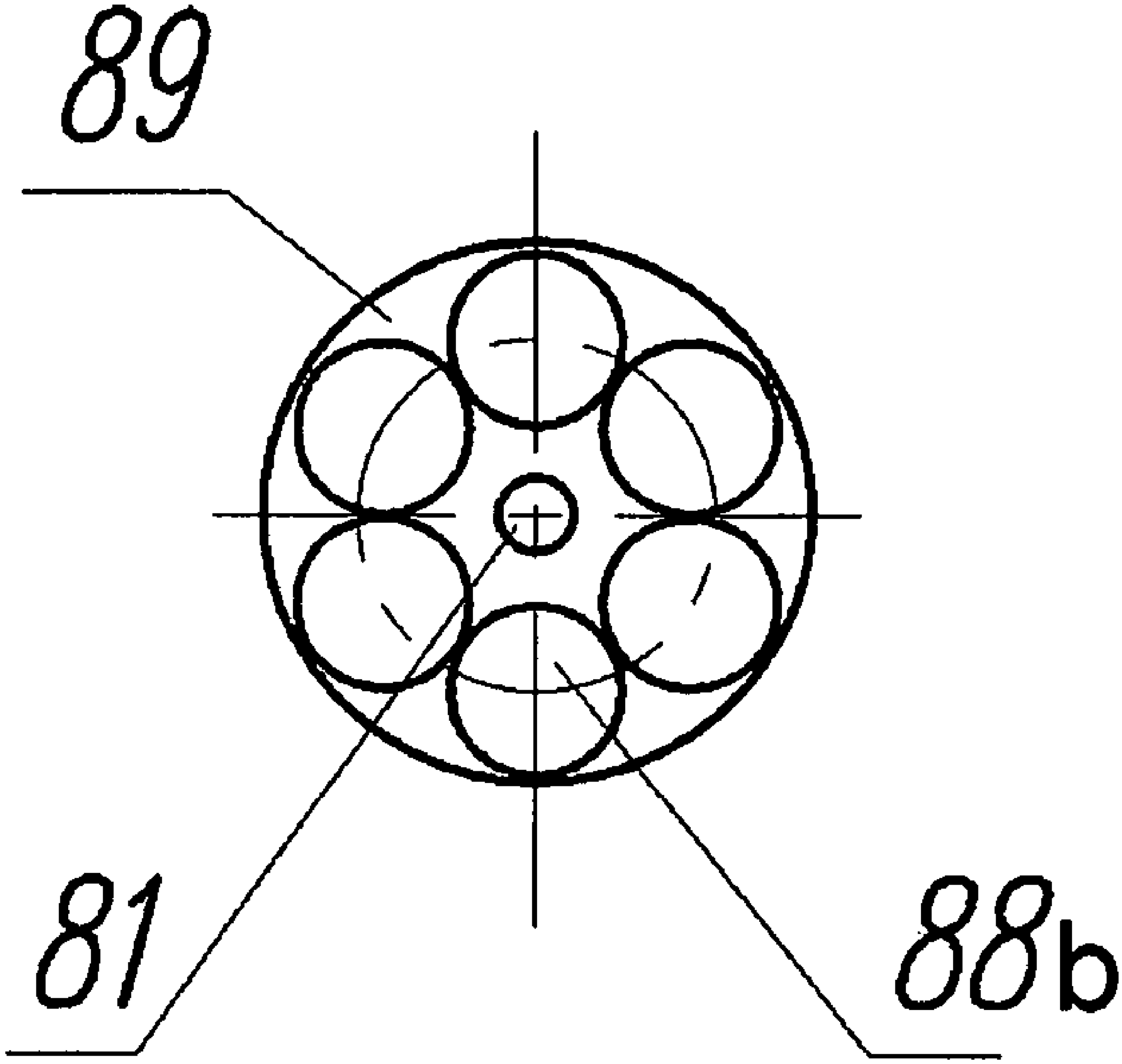
FIG. 10*c* is a sectional view of the embodiment illustrated in FIG. 10*b* taken along line D-D.

Turning next to FIG. 10b, an embodiment of a powder deliver zone is shown including a forming block, generally indicated at 84. The forming block 84 may include several sub-forming blocks 83a, 83b. Each of the sub-forming blocks 83a, 83b may include a throat 85 and an expansion zone 87. Exits 88a, 88b of the sub-forming blocks 83a, 83b may be arranged generally symmetrically around an axial powder injector 79. FIG. 10c is a sectional view of the embodiment shown in FIG. 10b taken along line D-D. The sectional view in FIG. 10c representationally depicts the relative position of the exits 88 of the sub-forming blocks to the exit 81 of the powder injector 79. Additionally, FIG. 10c representationally depicts the relative surface areas of the exits 88 of the sub-forming blocks relative to the surface area of the barrel entrance 89 (shown as the entrance of a barrel converging zone 33 in the illustrated embodiment). It should be noted, however, that the illustrated embodiment is not an exact scale representation. Consistent with the previous description, the surface area of the barrel entrance 89 to the cumulative surface area of the exits 88 of the sub-forming blocks may be in the generally range of between about 1.05 to about 1.7.

Figure 10D:
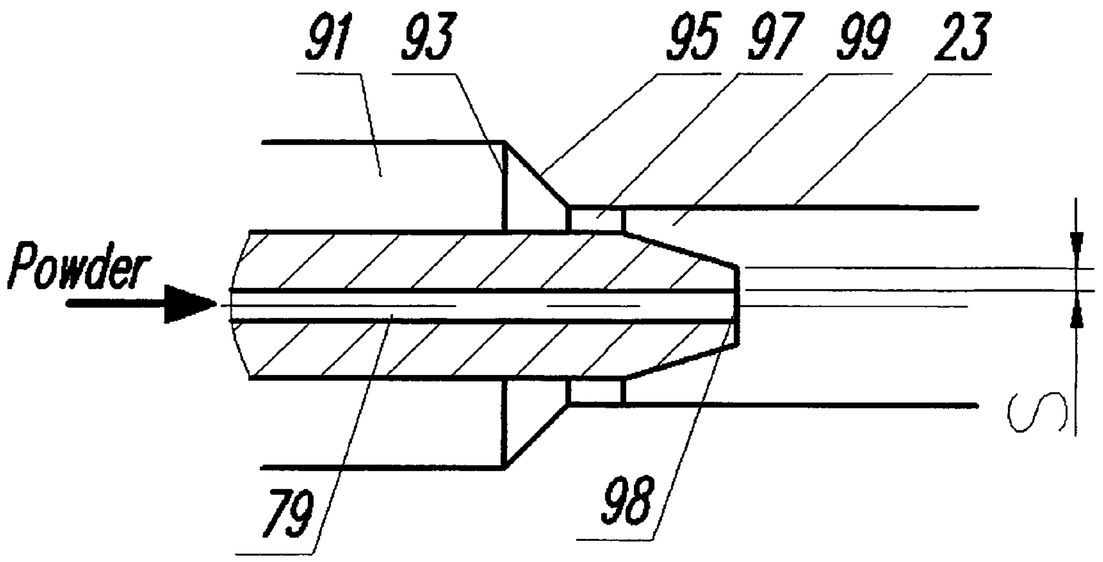
FIG. 10*d* illustrates another embodiment of an HVTS apparatus employing an axial powder injection arrangement.

FIG. 10d illustrates an embodiment in which a powder injector 79 may be disposed extending axially through at least a portion of the forming module. The converging zone 95, throat 97 and expansion zone 99 of the forming module may have an annular shape and may be formed by inner walls of the forming module and the outer wall of the powder injector 79. According to such an embodiment the compression ratio of the converging zone and/or the expansion ratio of the expansion zone may, at least in part, be a function of the profile of the powder injector. In the illustrated embodiment, the expansion zone 99 is shown having a constant diameter. The expansion ratio of the expansion zone 99 is provided by a decreasing cross-section of the powder injector 79. The net effect is an increase in the cross-sectional area of the gas passage moving through the expansion zone 99 in a downstream direction.

Figure 11:
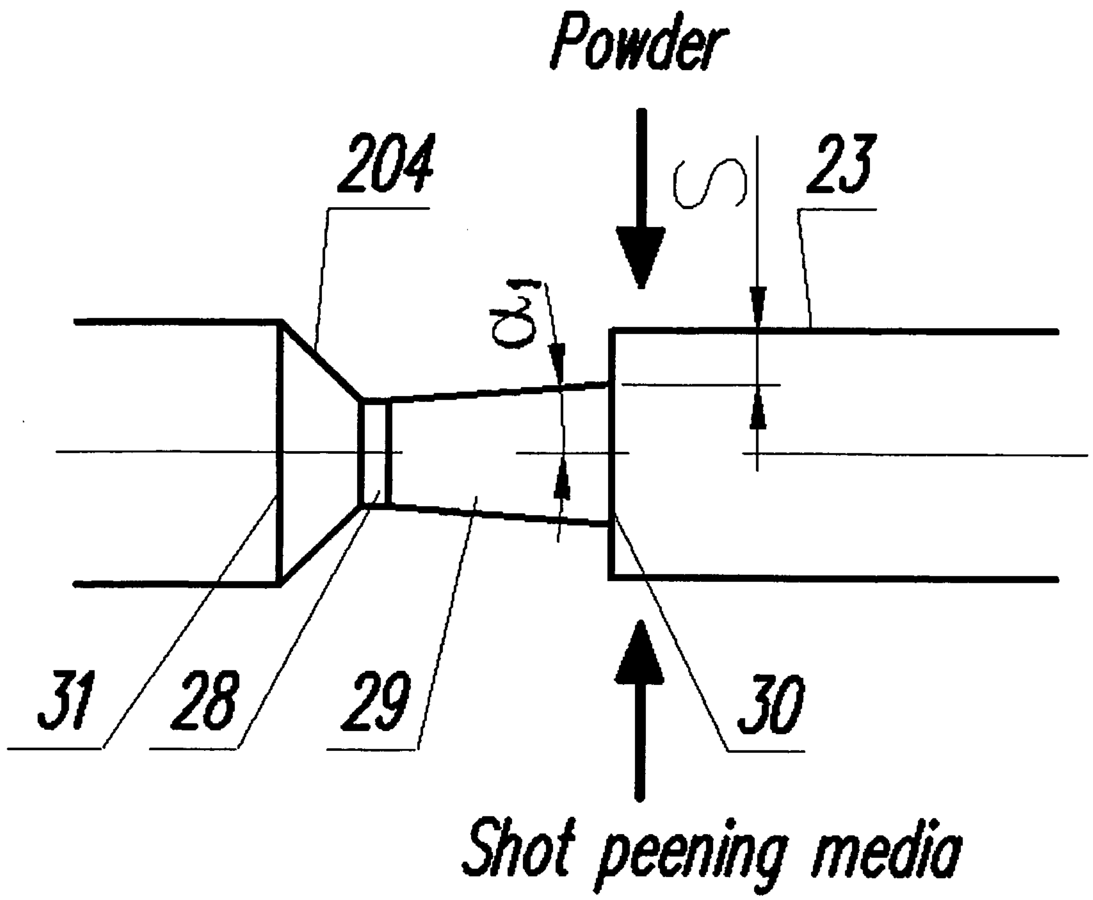
FIG. 11 illustrates an HVTS apparatus schematically showing a shot peening injection region.

Consistent with one embodiment, simultaneous shot peening and spray coating may be carried out such that the coating being sprayed is shot peened as it is being deposited. Consistent such an embodiment, partial layers, i.e. layers having a thickness less than a total final coating thickness, may be shot peened as the partial layers are applied, rather than shot peening the final, full thickness coating after the coating has been deposited. Simultaneous shot peening and spray coating may provide a coating having a better quality, higher deposit efficiency, and controllable stresses. Various configurations of an HVTS apparatus may be employed to provide simultaneous shot peening and spray coating. According to one embodiment, a shot peening media may be pre-mixed with a spraying powder. The mixture of shot peening media and spraying powder may be introduced into the gas stream together. Consistent with a related embodiment, rather than pre-mixing the shot peening media and the spraying powder, the shot peening media and the spraying powder may be fed into the gas stream using separate injectors, such as illustrated in FIG. 11.

According to one embodiment, it is recognized that shot peening may be more effective when shot peening media temperature is relatively low. With reference to the embodiment depicted in FIG. 8, the shot peening media may be introduced into the gas stream at a downstream location relative to the powder injection. Consistent with the illustrated embodiment, the shot peening media may be introduced at a low pressure zone formed by the downstream shock wave generator G2. By introducing the shot peening media at a downstream location, the shot peening media may experience less heating, and may, therefore, achieve a lower temperature as compared to the spraying powder.

Figure 12:
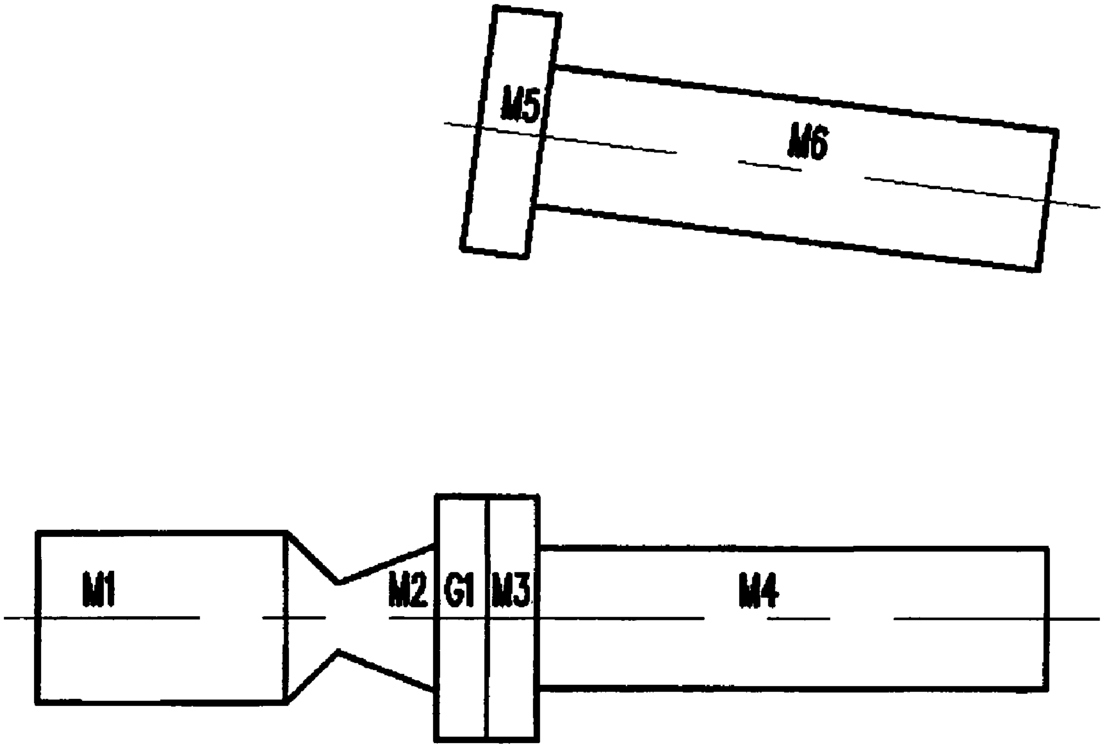
FIG. 12 illustrates an HVTS apparatus including a separate module for a shot peening.

According to yet another embodiment, it is appreciated that in some instances simultaneous shot peening and spray coating may be effective if the shot peening media is not heated. FIG. 12 illustrates and embodiment in which simultaneous shot peening and spray coating are carried out using a separate barrel M6 for accelerating the shot peening media. The shot peening barrel M6 may be connected to a source of a pressurized gas (not shown) and a source M5 of the shot peening media. Consistent with this embodiment any heating of the shot peening media may be minimized. Additionally, the cooling effect resulting from the use of pressurized gas to accelerate the shot peening media may provide advantages as a result of cooling the substrate during the simultaneous shot peening process.

Figure 13:
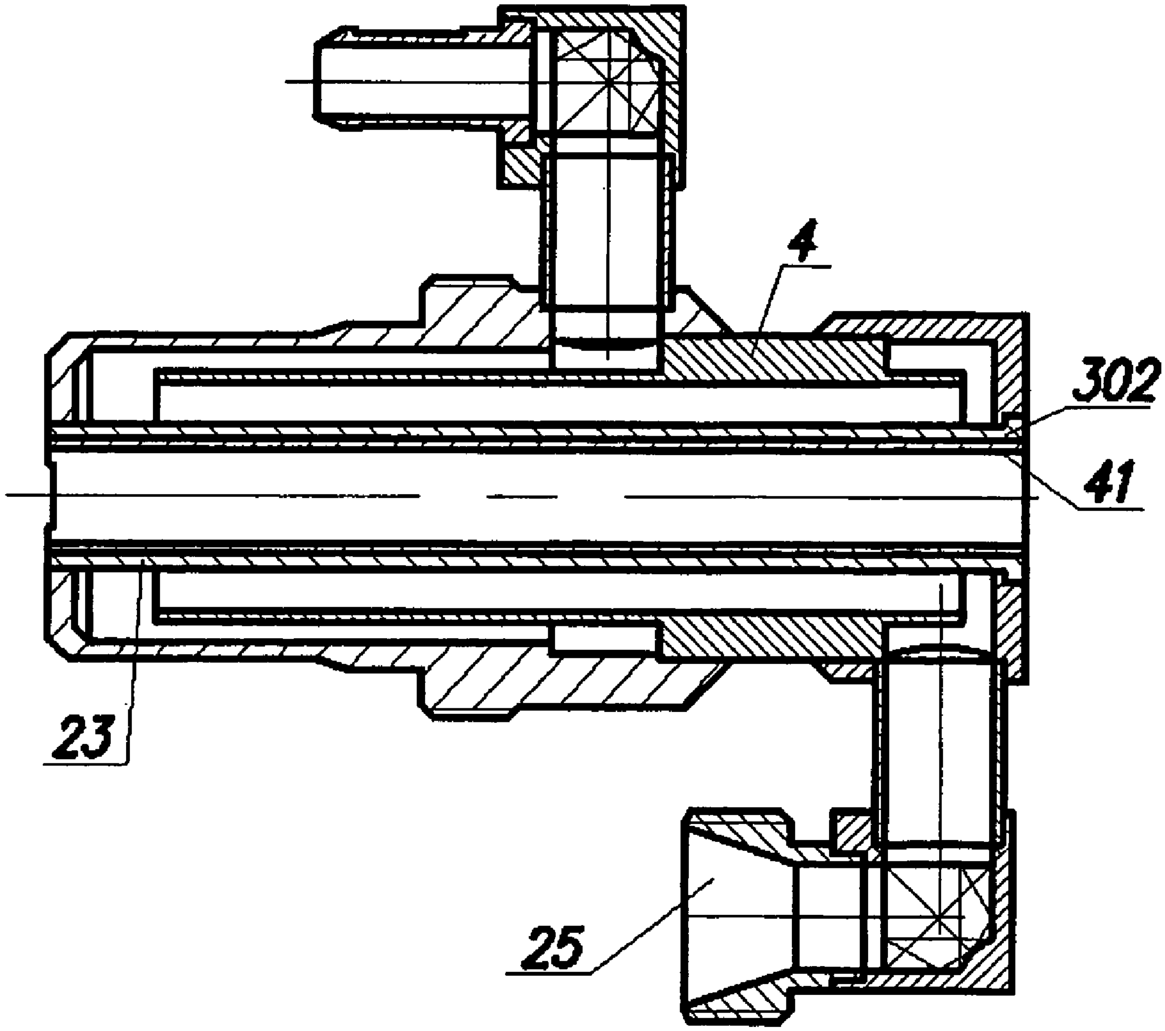
FIG. 13 is a cross-sectional view of an embodiment of a double sleeve barrel that may be employed with an HVTS apparatus consistent with the present disclosure.

FIG. 13 illustrates an embodiment of a barrel module M4 in which the barrel 23 includes an inner sleeve 41 and an outer sleeve 302. Consistent with this embodiment, the inner sleeve 41 of the barrel 23 may be formed from a material having a higher thermal conductivity than the outer sleeve 302. Contact between the inner sleeve 41, which is heated by the gases and/or products of a combustion process, and the outer sleeve 302 may remove heat from the inner sleeve 41, but at a rate that is lower than a system using only a material with a high thermal conductivity. Accordingly, the temperature of the barrel, as well as any other components utilizing a similar configuration, may be more effectively controlled without removing too much heat and thereby reducing the temperature of the heated gases traveling through the barrel below a desired level. Consistent with one embodiment, an inner and outer sleeve arrangement may provide an HVTS apparatus that more efficiently contains the heat in the jet of heated gases emerging from the gun. According to such an embodiment heat retention in the jet of heated gasses may be on the order of between about 5 to 10% higher as compared to a single layer construction. Furthermore, the use of an inner sleeve 41 having a higher thermal conductivity than the outer sleeve 302 may decrease the occurrence of material, e.g. powder, build-up inside the barrel 23. In one embodiment consistent with this aspect, the inner sleeve 41 may be formed from copper or a copper alloy and the outer sleeve 302 may be formed from a material such as stainless steel or a nickel based alloy.

The forming module M2, powder injection module M3, barrel M4, and shock wave generators G1 and G2 described above may be used in combination with a variety of different heating modules. Embodiments of specific heating modules are described and illustrated with reference to FIGS. 14 through 22. The specific modules illustrated and described herein are provided as examples of heating modules that may suitably be used in combination with the forming modules, powder feeding modules and barrel modules described above, and should not be considered to limit the design and/or configuration of forming modules, powder feeding modules, and/or barrel modules that may be used in combination with any disclosed heating module herein.

Consistent with the present disclosure, the heating module may be a combustion module burning fuel and oxidizer, thus providing high temperature, high velocity gases as products of combustion. One embodiment of an HVTS apparatus 100*a* consistent with the present disclosure having a high efficiency combustion module M1 as a heating module is illustrated in cross-section in FIG. 14. As shown, the combustion module M1 may include a pre-combustion chamber (herein "pre-chamber") 2, a combustion chamber 3, a spark plug housing 1, and a spark plug 9. As shown, the pre-chamber 2 and the combustion chamber 3 may be positioned adjacent to each other, with the pre-chamber 2 being disposed upstream of the combustion chamber 3. An oxidizer, such as gaseous oxygen, air, a liquid oxidizer, etc., and mixtures thereof, capable of supporting combustion, may be supplied to the combustion module M1 through a pipe or line 5, and may be introduced in to a circular oxidizer collector 6. A portion of the oxidizer supplied to the oxidizer collector 6 may be directed through a hole, or set of holes, 7 into a central zone 8 of the spark plug housing 1. The oxidizer may be further directed through the spark plug housing 1 and along the electrode 77 of the spark plug 9 disposed in a central channel 10 and into an ignition zone 11 that may open into the pre-chamber 2. The oxidizer flowing through the spark plug housing 1 and into the ignition zone 11, may flow across the electrode of the spark plug 77 and may cool the electrode and/or protect the electrode against overheating. According to one embodiment, between about 1% to about 20% of the oxidizer introduced into the oxidizer collector 6 may be directed along the spark plug housing 1 and ultimately into the ignition zone 11. In a further embodiment, between about 5% to about 10% of the oxidizer introduced in to the oxidizer collector 6 may be directed to the ignition zone 11 as described above.

The portion of the oxidizer not directed to the ignition zone 11, may be directed to a second oxidizer collector 13, for example, through openings 12 that may be in communication with the second oxidizer collector 13. The second oxidizer collector 13 may be in communication with the pre-chamber 2 via two sets of holes 15 for directing the oxidizer from the second oxidizer collector 13 into a downstream zone of the pre-chamber 2. According to one embodiment, the two sets of holes 15 may be provided each having a generally circular pattern distributed about the inside diameter of the pre-chamber 2.

Consistent with one embodiment, the oxidizer flow rate through the downstream set of holes 15 may be greater than the oxidizer flow rate through the upstream set of holes 15. In one such embodiment, the flow rate of oxidizer through the downstream set of holes 15 may be in the range of between about 50% to about 80% of the total oxidizer flow rate into the apparatus 100*a*. Correspondingly, in such an embodiment the flow rate of oxidizer through the upstream set of holes 15 may be in the range of between about 10% to about 40% of the total flow rate of oxidizer into the apparatus 100*a*. According to one embodiment, the ratio of oxidizer flow through the various set of holes 7, 15, may be controlled by controlling the total surface area of each of the sets of holes 7, 15, with respect to one another.

Consistent with one embodiment, the fuel used in the HVST herein may be a liquid fuel. Suitable liquid fuels may include, but are not limited to, hydrocarbon fuels, such as, kerosene, alcohol, and mixtures thereof. Various other fuels may also suitably be used with an HVST according to the preset disclosure. According to one embodiment, kerosene may be employed to provide a higher combustion temperature and higher heat output relative to an equal mass of alcohol. However, different grades of kerosene may have different chemical compositions and densities, and, therefore, may exhibit different combustion performances. Even the same grade of kerosene may allow some variations in combustions performance. Therefore, some adjustments of combustion parameters may be used for a particular grade of kerosene. Therefore, according to another embodiment, alcohol may provide a more consistent fuel, with various alcohols having a fixed chemical formulas and related properties. Accordingly, notwithstanding the lower combustion temperatures and lower heat outputs, alcohol may provide an advantageous fuel in some application, e.g., in which consistent combustion and consistent coating quality are required. Alcohol may also be attractive from safety standpoint, in that an alcohol fire may be extinguished using water in the case of an emergency.

Fuel may be supplied to the HVTS apparatus 100*a* via a fuel supply line 16 to a fuel collector 17. The fuel collector 17 may be configured as a circular passage around the ignition zone 11. At least one delivery passage 18 may be provided extending between the fuel collector 17 and the interior of the ignition zone 11. In this manner, a portion of the fuel delivered to the ignition zone 11 may be atomized and form fuel droplets. The portion of the fuel that is not atomized may form a thin film of fuel on the interior walls of the ignition zone 11. The thin film of fuel on the interior walls of the ignition zone 11 may extend into the pre-chamber 2. The thin film of fuel on the interior walls of the ignition zone 11 and the interior walls of the pre-chamber 2 may evaporate from the walls. Evaporation of the fuel may promote more efficient combustion of the fuel, and may also cool the walls of the ignition zone 11 and/or the pre-chamber 2 through evaporative cooling.

The atomized fuel and the fuel evaporating from the walls of the ignition zone 11 may mix with the oxidizer supplied to the ignition zone 11 through central zone 8 from the oxidizer collector 6. The spark plug 9 may ignite the oxidizer-fuel mixture and generate a pilot flame that may originate in the region of the ignition zone 11. The controlled supply of oxidizer in the ignition zone 11 and the limited quantity of fuel vapor in the ignition zone 11 may allow only a portion of the fuel delivered from the fuel collector 17 via the delivery passage 18 to combust in the ignition zone 11 and adjacent portion of the pre-chamber 2. Heat generated by the pilot flame, however, may begin to preheat the thin film of fuel on the walls of the ignition zone 11 and the pre-chamber 2. Preheating the fuel in this manner may also accelerate the evaporation of the thin film of fuel from the walls of the ignition zone 11 and pre-chamber 2.

The fuel that is pre-heated and/or at least partially evaporated by the combustion in the ignition zone 11 may then experience additional combustion adjacent the upstream set of oxidizer holes 15. The restricted flow of oxidizer through the upstream oxidizer holes 15 may prevent the complete combustion of all of fuel in the pre-chamber 2. The heat of combustion adjacent the upstream set of oxidizer holes 15 may further heat and/or evaporate any fuel not consumed by the combustion.

Final combustion of remaining fuel, which may have been vaporized by combustion adjacent the upstream set of oxidizer holes 15, may occur in the combustion chamber 3. The combustion in the combustion chamber 3 may be fed by the oxidizer made available via the downstream oxidizer holes 15 adjacent to the exit of the pre-chamber 2. As mentioned above, the downstream set of oxidizer holes 15 may release the majority of the oxidizer provided to the system. Fuel vapor requires a smaller space and less time to achieve complete combustion, as compared with non-vaporized fuel. The fuel supplied to the combustion chamber 3 may be at least partially vaporized due to the heat of combustion adjacent the upstream set of oxidizer holes 15. The at least partially vaporized fuel burned in the combustion chamber may allow the volume and surface area of the combustion chamber 3 to be smaller than would be required for combusting liquid fuel. More intense combustion of the fuel and the oxidizer may take place in downstream region of the pre-chamber 2 of the HVTS apparatus 100*a* because the flow of oxidizer from the downstream set of oxidizer holes 15 may allow larger-scale combustion of the fuel and oxidizer than experienced in the region adjacent the upstream set of oxidizer holes 15.

Figure 14:
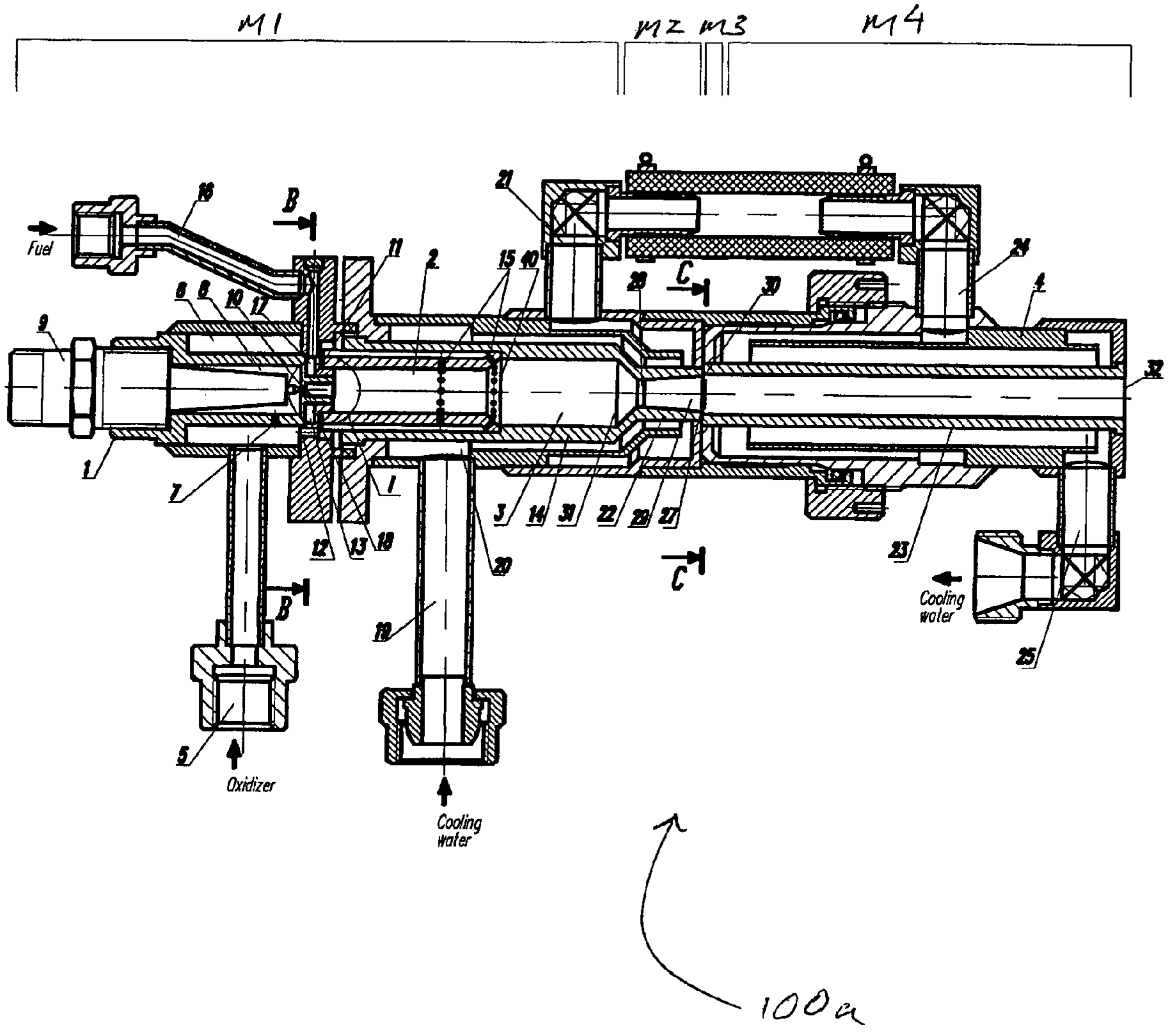
FIG. 14 is a cross-sectional view of an embodiment of an HVTS apparatus consistent with the present disclosure.

The combustion chamber 3 of the HVTS apparatus 100*a* may be water cooled. The relatively small surface area of the combustion chamber 3 may, however, reduce heat losses, or extraction, from the combustion chamber to the cooling water. The reduced heat extraction by the cooling water may, in some embodiments, result in a high thermal efficiency of combustion and a high temperature of the combustion products, i.e. the combustion gases. With reference to FIG. 14, cooling water, or some other cooling medium, may be supplied to the HVTS apparatus 100*a* through a cooling supply line 19 and into a water collector 20, in the general region of the pre-chamber 2 in the illustrated embodiment. Cooling water may pass from the water collector 20 and flow around the combustion chamber walls 14 to provide cooling for the combustion chamber 3. After the water has passed around the walls 14 of the combustion chamber 3, the water may pass through a by-pass system 21. The by-pass system 21 may include a barrel supply line 24, communicating the cooling water from the by-pass 21 to the barrel 4 of the HVTS apparatus 100*a*, allowing the barrel 4 to also be cooled by the same cooling system. The cooling water may exit the barrel 4 through a coolant discharge 25. The cooling water may be disposed of as waste water or re-circulated, and may, for example, be passed through a temperature conditioning circuit or a chiller.

Figure 15:
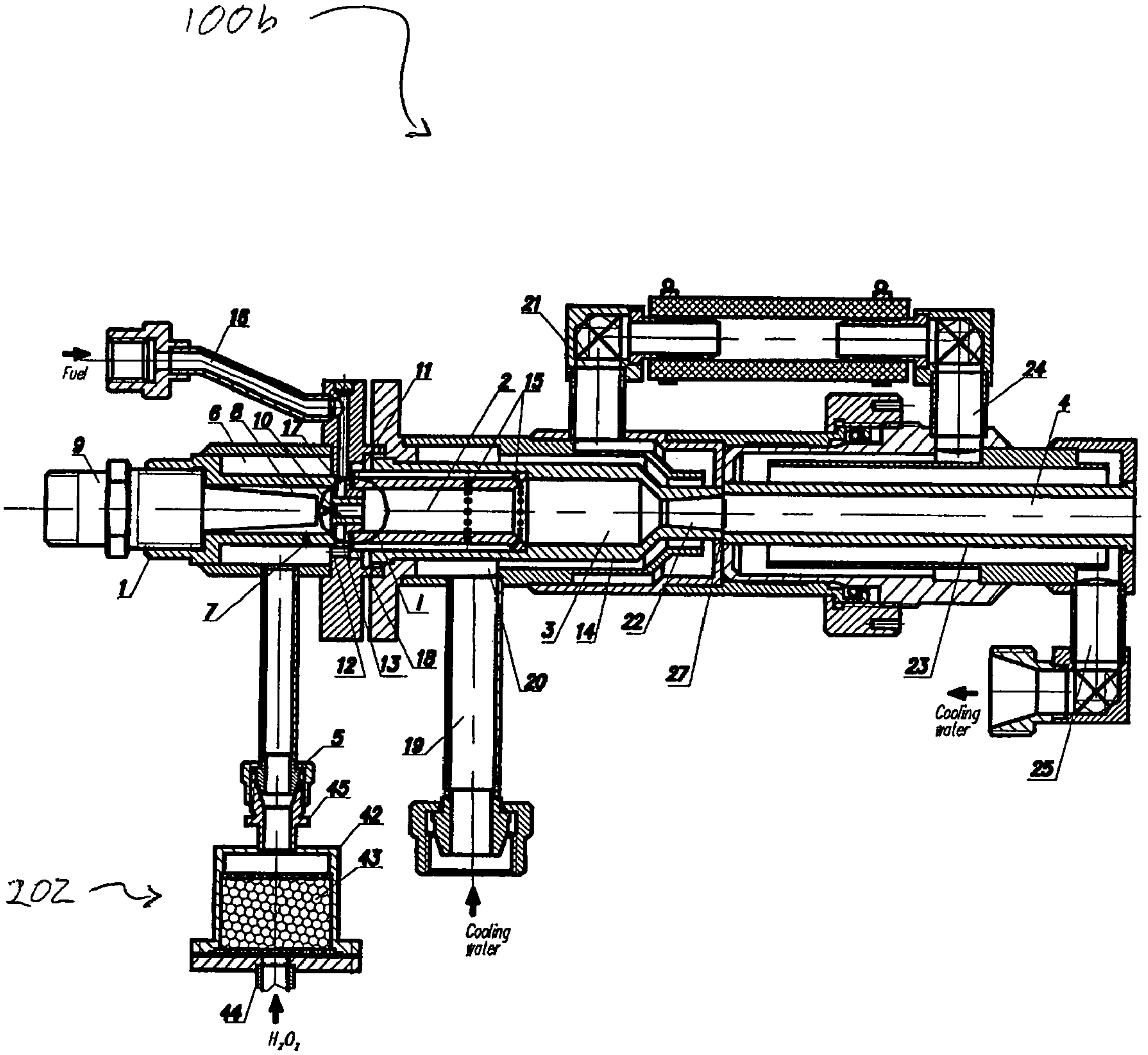
FIG. 15 is a cross-sectional view of an embodiment of an HVTS apparatus configured for use with a peroxide oxidizer according to the present disclosure.

Referring to FIG. 15, an embodiment of a HVTS apparatus 100*b* specifically adapted to the use of hydrogen peroxide or aqueous hydrogen peroxide solution as an oxidizer is shown. In some cases, hydrogen peroxide may provide safety benefits, especially when provided in an aqueous solution having a hydrogen peroxide concentration less than about 70% by weight, for example arising from the greater ease of handling a liquid versus a gas, etc. Consistent with such an embodiment, the HVTS apparatus may be equipped with a hydrogen peroxide supply system 202. The hydrogen peroxide supply system may include a catalytic converter 42, which may be coupled to a hydrogen peroxide supply line 44. The hydrogen peroxide supply system 202 may include an outlet 45 for coupling the hydrogen peroxide supply system 202 to the oxidizer supply line 5 of the HVTS apparatus 100*b*. The catalytic converter 42 may include a catalytic structure 43, which may include a granular catalyst, catalyst disposed on a substrate, or a catalyst itself formed, for example in a honeycomb configuration, etc., to contact hydrogen peroxide flowing through the catalytic converter 42. The catalyst of the catalytic structure may convert liquid hydrogen peroxide, or an aqueous solution thereof, introduced from the supply line 44 into a gaseous, or semi-gaseous, state when it is introduced to the oxidizer supply line 5 of the HVTS apparatus 100*b*. The hydrogen peroxide, or aqueous solution thereof, may be preheated by the interaction with the catalytic structure. Additionally, or alternatively, the catalytic converter 42 may include a heating element for preheating the gaseous, or semi-gaseous, hydrogen peroxide supplied to the HVTS apparatus 100*b*. Various different catalysts may be employed to convert the hydrogen peroxide to a gaseous, or semi-gaseous, state, including, but not limited to, permanganates, manganese dioxide, platinum, and iron oxide. The combustion temperature achieved by the fuel-peroxide mixture may be influenced, at least in part, by the concentration of hydrogen peroxide utilized.

The present disclosure recognized that, in some instances, high temperature materials such as Ni and Co based alloys, and carbides may require a longer dwell time in a stream of hot combustion gases in order to achieve a desired temperature for efficient coating compared to other lower temperature materials. Longer particle dwell times may be provided by increasing the length of the barrel of a thermal spray apparatus. However, a longer barrel may generally result in a greater amount of heat loss, and an increased probability that the material will build up on an interior wall of the barrel of the thermal spray apparatus.

Consistent with a further embodiment, the dwell time of particles in a stream of hot combustion gases in a high velocity thermal spray apparatus may be controlled by providing an additional combustion region downstream of the combustion module M1 for producing a secondary stream of hot gases inside of a secondary barrel. The additional combustion region may supply sufficient heat, etc., to reduce or control the heat loss that may be associated with a longer barrel. Accordingly, a longer barrel may be employed in conjunction with an additional combustion region to thereby permit a long barrel and an associated increase in dwell time without the undesired cooling of the gas stream. The additional combustion region may be provided located around the primary barrel of the barrel module M4. Consistent with one embodiment, the secondary barrel may have a larger diameter than the primary barrel. According to such an embodiment, the velocities of the primary and second streams of combustion gases, generated by the combustion module M1 and secondary combustion region respectively, may be controlled by the respective combustion pressures and relative geometries of the barrels.

Figure 16:
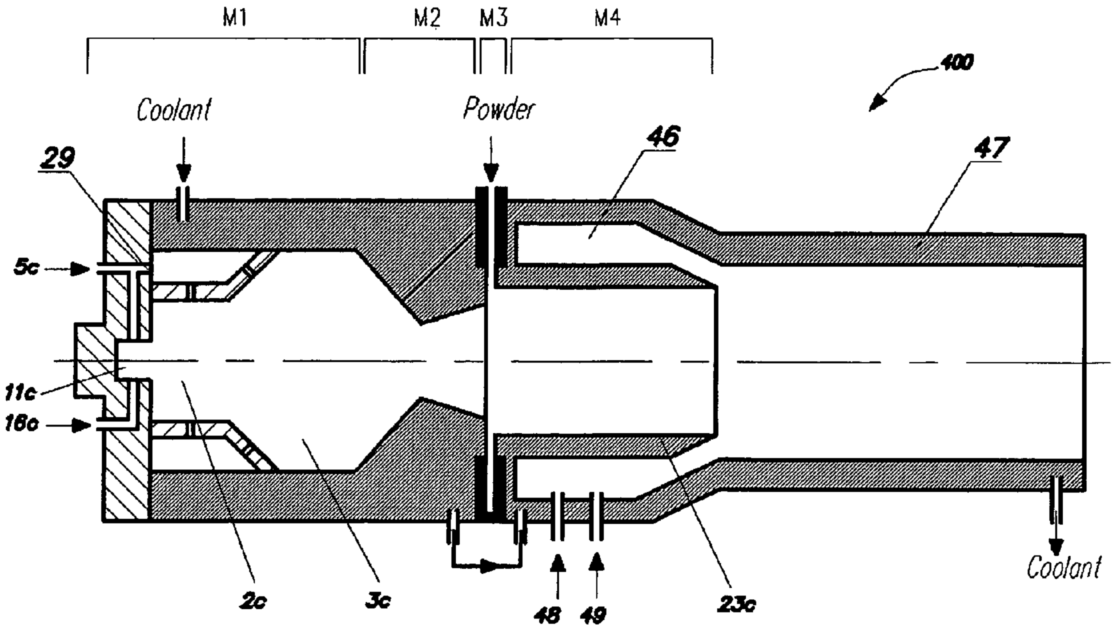
FIG. 16 is a schematic illustration of an embodiment of an HVTS apparatus including a secondary combustion region.
Figure 17:
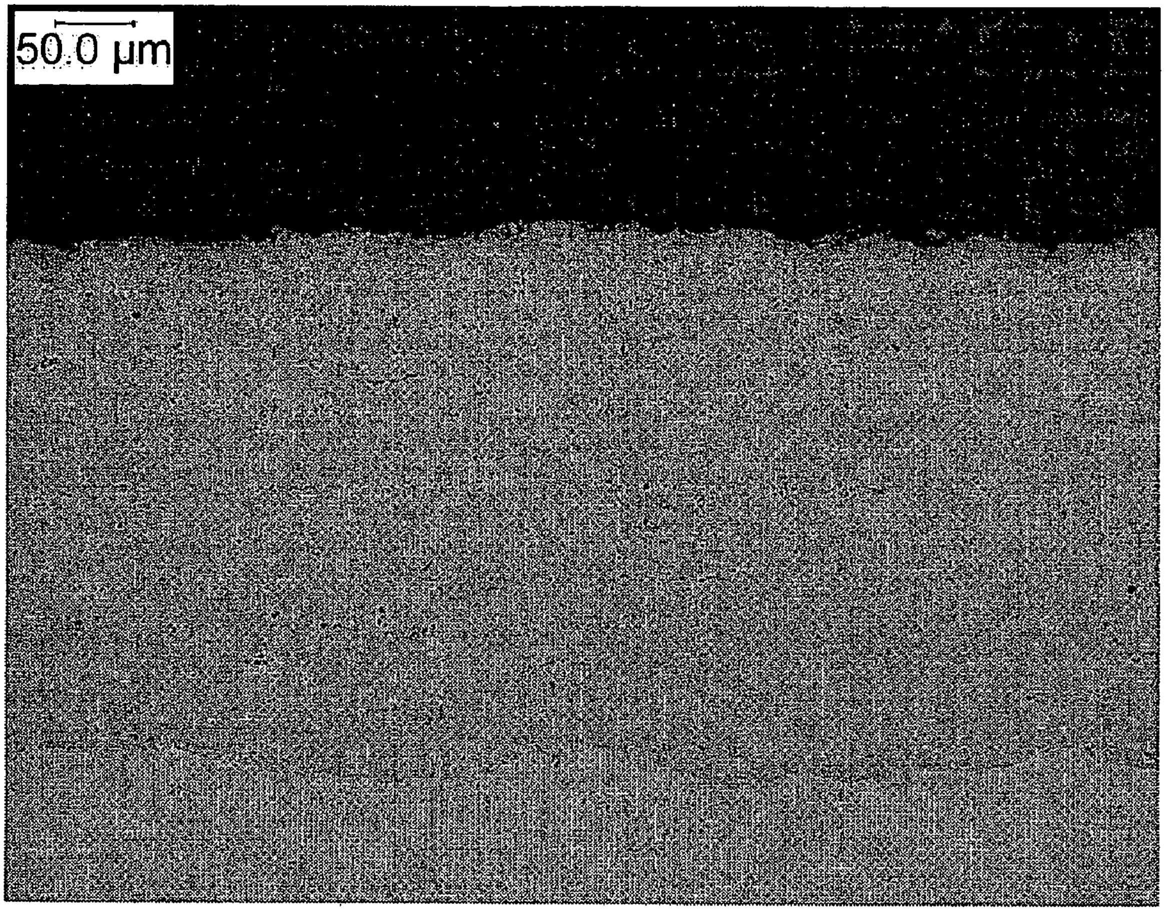
FIG. 17 is a magnified cross-section of a WC-12Co coating sprayed by an HVST apparatus herein.

Turning to FIG. 16, a further embodiment of an HVTS apparatus 400 is schematically illustrated. Consistent with this further embodiment, the HVTS apparatus 400 may include an ignition zone 11*c*, a pre-combustion chamber 2*c* and a combustion chamber 3*c* that may be generally configured as described above. Specifically, an oxidizer inlet 5*c* may supply an oxidizer to the apparatus 400. The oxidizer may be distributed through an oxidizer collector 6*c* to the ignition zone 11*c*, the pre-chamber 2*c*, and the combustion chamber 3*c* in a manner generally consistent with the preceding embodiments. Similarly, fuel may be supplied through a fuel inlet 16*c* and distributed in the ignition zone 11*c*, pre-chamber 2*c*, and combustion chamber 3*c* in a manner generally consistent with the preceding embodiments. Furthermore, the HVTS apparatus 400 may include a forming module M2, powder module M3, and barrel module M4 that are generally consistent with the preceding embodiments.

The HVTS apparatus 400 may also include a secondary oxidizer supply 48 and a secondary fuel supply 49 into a secondary combustion device 46 disposed around the primary barrel 23*c*. As illustrated, the secondary combustion device 46 may generally provide a mixing chamber for the oxidizer and fuel supplied through the secondary oxidizer and fuel supplies 48, 49. The primary gas stream, generated in the combustion module M1, i.e., the ignition zone 11*c*, pre-combustion chamber 2*c*, and combustion chamber 3*c*, may exit the primary barrel 23*c*, may ignite the mixture of oxidizer and fuel in the secondary combustion device 46. The combustion products, or gases, for the combustion module M1 and from the secondary combustion device 46 may flow through the secondary barrel 47. The secondary barrel may extend the dwell time of particles in a high temperature stream, and thereby reduce the probability of a build up of particles on the wall of the secondary barrel 47.

According to one embodiment, the heating module M1 may be a plasma torch. Providing the heating module M1 configured as a plasma torch may provide various advantages arising from the wide range of available plasma enthalpies, temperatures, and velocities. However, plasma torches may experience erosion of electrodes which may shorten the operation time in between required servicing, and may in some condition result in contamination of the coating by erosion products. Erosion experienced by electrodes in a plasma torch may, at least in part, depend on plasma gases and their purity, plasma pressure and plasma current. Generally, higher plasma pressure and higher plasma current may increase the rate of erosion of the electrodes. A high pressure plasma apparatus may be useful for providing a high pressure and high velocity apparatus. Therefore, decreasing of the operating current may be one approach to increasing life of electrodes which still providing a high pressure plasma torch that may be suitable for use as an industrial tool. It may be desirable to employ an operating current at or below 400 A to provide a plasma torch having a 4-5 bars plasma pressure. It may be even more preferred to employ an operating current at or below 300 A for higher pressure plasmas. Accordingly, plasma torches having minimum operating voltage above 125V are needed achieving 50 KW power level at 4-5 bars pressure. An operating voltage on the order of between about 180V to about 200V may be desirable for higher plasma pressures and/or higher power levels.

Consistent with the present disclosure, various different designs of high voltage plasma torches may be used as a heating module for a HVTS apparatus. For example, a 200 kW PlazJet™, manufactured by Praxair Technology, Inc., operating at approximately 400 volts may be used to provide up to about a 160 kW power level. Other suitable plasma devices may include, for example, a 100HE plasma torch, manufactured by Progressive Technologies, Inc., operating at approximately 200-230 volts may be used to provide up to about 80-90 kW power level.

A cascade plasma torch may provide an especially advantageous option for a plasma based heating module. A cascade plasma torch may generally include a cathode mounted in a cathode holder. An anode may be provided having a cylindrical shape, or may have some means to stabilize the position of the anode arc root in order to minimize pulsation of plasma parameters. The means for stabilizing the position of the anode arc root may include a step. A cascade plasma torch design may be used for Low Pressure Plasma Spraying (LPPS). A cascade torch may also be provided with the anode, or a forming module, having a converging-diverging, or De Laval, profile. Such a cascade plasma torch may be suitable for use in high pressure spraying applications.

One design consideration in providing a plasma torch suitable for use as a heating module of an HVTS apparatus herein is the configuration and design of the anode. The anode may be configured for different plasma passage geometries. Therefore, the anode may serve as a forming module for the plasma. However, as discussed above, the anode may be a subject of erosion. In order to minimize the problems associated with anode corrosion, the forming module of the plasma apparatus may be separated and electrically insulated from the anode. By separating the anode from the forming module and electrically insulating the forming module from the anode, it may be possible to reduce or eliminate the influence of anode wear on the forming module and plasma parameters. Notwithstanding the separation and electrical insulation of the forming module from the anode, it may still be desirable to stabilize the position of the anode arc root.

Generally, in providing a plasma torch there may be four general options for the anode configuration and/or forming module configuration. First, the anode may serve as the forming module of the plasma device. Second, the anode may have a means for stabilizing the arc root and the anode may serve as the forming module of the plasma device. According to one example, the arc root of the anode may be stabilized by a step. According to a third option, the anode and forming module may be electrically insulated from one another. Finally, the anode and the forming module may be electrically isolated, and the anode may include a means for arc stabilization.

Figure 18:
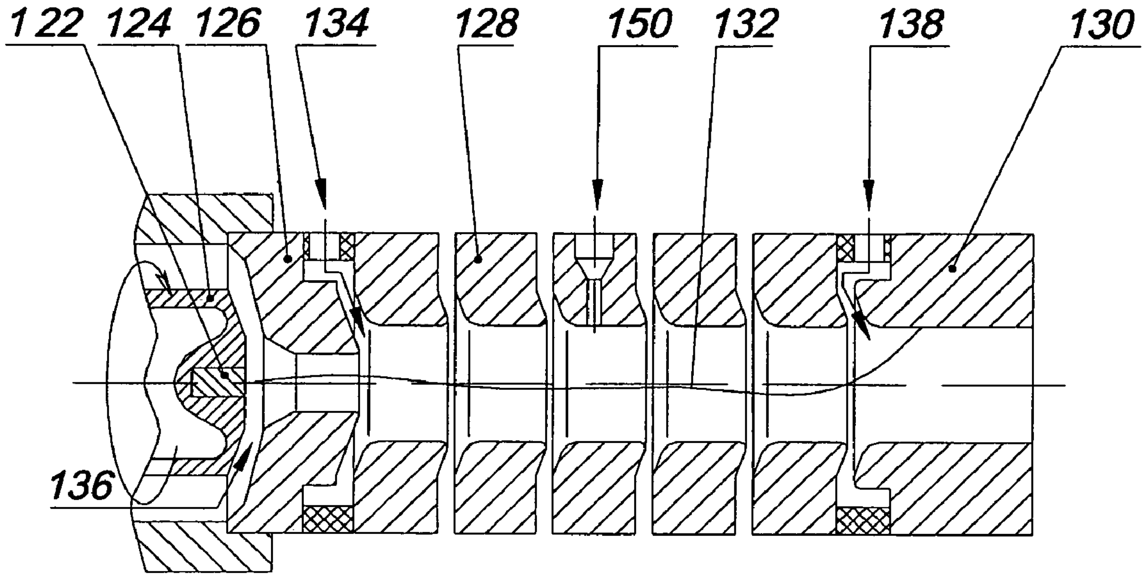
FIG. 18 is a general schematic illustration of an embodiment of a cascade plasma torch.

Consistent with the present disclosure, a plasma torch may be utilized as a heating module for a HVTS apparatus herein. The plasma torch may be configured as a cascade plasma torch that may provide a stable heating module and the ability to use a high-voltage, low current approach that may suitably be used with a wide range of plasma gas flow rates and related Reynolds's numbers. Such a cascade plasma gun may be capable of realizing laminar, transition, and turbulent plasma jet flows. The principles of a cascade plasma torch herein are schematically illustrated in FIG. 18, and described with reference thereto. As shown, an anode module 130 may be provided having a conventional cylindrical plasma passage. However, the anode module 130 may be configured having various different internal wall profiles, thereby allowing a stable position of the anode arc root and providing a plasma jet having different, controllable, temperatures and velocities. According, the anode module 130 may also serve as a forming module for the plasma torch. The anode module 130 may also include a means for stabilizing the position of an anode arc root and may be coupled, either directly or indirectly, to a separate forming module that may be electrically insulated from the anode module 130.

The embodiment of a cascade plasma torch in illustrate in FIG. 18 includes cathode module include a cathode 122 mounted in a cathode holder 124. The plasma torch may also include an anode module 130, a pilot insert 126 and intermediate module having at least one interelectrode insert (IEI) 128 that is electrically insulated from cathode 122 and from the anode module 130. The interelectrode inserts 128 may generally be spacers that provide a desired separation between the anode and cathode, and may define the length of the plasma chamber. Accordingly, the number of IEI employed in a specific plasma torch may depend, at least in part, on the desired operating voltage and arc length. In the illustrated embodiment of FIG. 18, four IEI shown which may provide the plasma torch with an operating voltage in the general range of between about 150-250 V. A greater number of IEI may be required if a higher operating voltage is to be employed. The cascade plasma torch may also have a passage 150 that may be connected to a pressure sensor (not shown). The pressure sensor may be provided as part of a feedback circuit that may be used to control the pressure in the plasma channel.

It may be desirable and/or necessary to cool the various components of the plasma torch. Consistent with one embodiment, the various elements or modules of the plasma torch may be water cooled. Consistent with the illustrated embodiment, a first plasma gas may be supplied through a passage 136 and into a space between cathode 122/cathode holder 124 and the pilot insert 126. A second plasma gas may be supplied to the plasma channel through a passage 134. The flow rate of the second plasma gas may be greater than the flow rate of the first plasma gas. Consistent with one embodiment, under operating conditions, after the main arc has been initiated, the second flow rate may be around 5-10 times greater than the first flow rate. The first and second plasma gasses may be, for example, argon, hydrogen, nitrogen, air, helium or their mixtures. Other gases may also suitably be used.

Consistent with one embodiment, the first plasma gas may be argon. The argon first plasma gas may shield the cathode 122. Shielding the cathode 122 with the first plasma gas may extend the life of the cathode 122. Similarly, the anode 130 may be protected by anode shielding gas that may be supplied through a passage 138 adjacent the anode 130 and into anode plasma passage. The anode shielding gas may be, for example, argon or hydrocarbon gas like natural gas. According to one embodiment, the anode shielding gas may result in a diffusion of the anode arc root which, consequently, may increase life of the anode.

The cathode 122 may be connected to a negative terminal of a DC power source (not shown). During plasma ignition the positive terminal of the power source may be connected to the pilot insert 126. A high voltage, high frequency oscillator (not shown) may initiate a pilot electrical arc between the cathode 122 and the pilot insert 126. The DC power source may be employed to support the pilot arc. The pilot arc may ionize at least a portion of the gases in a passage between cathode 122 and anode 130. The pilot arc may then be expanded through the ionized plasma passage by switching the positive terminal of the DC power source from the pilot insert 126 to anode module 130. Expanding the pilot arc through the ionized plasma passage to the anode module may generate the main arc 132.

Figure 19:
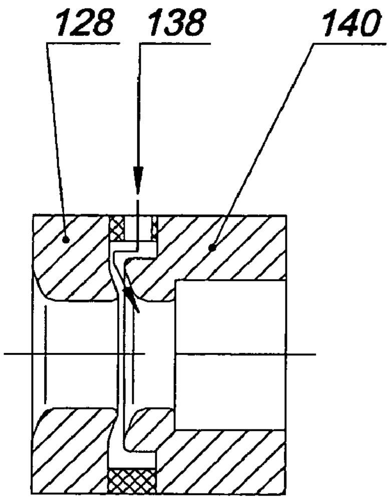
FIG. 19 illustrates a stepped anode that may be employed in a plasma torch.
Figure 20:
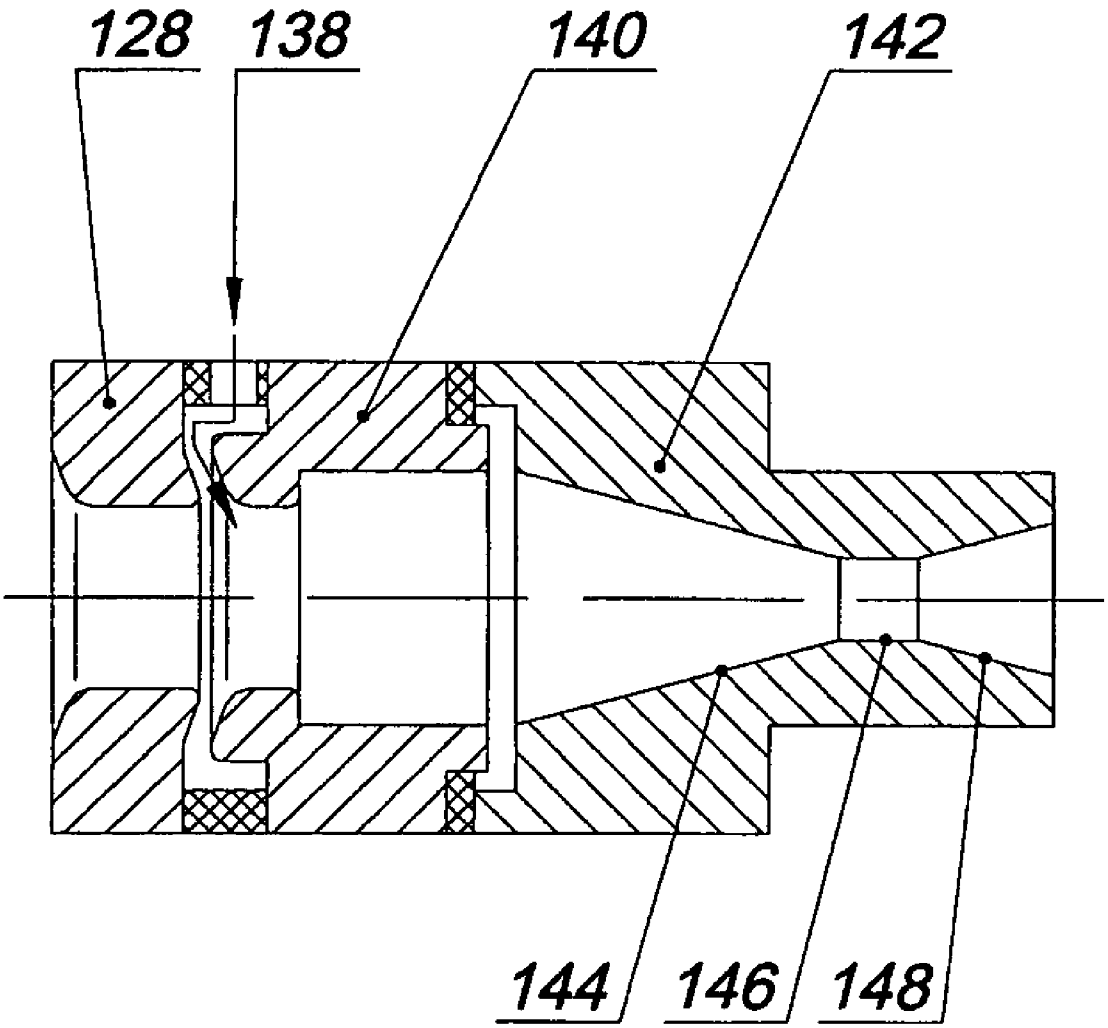
FIG. 20 illustrates an embodiment of a forming module of a plasma torch that is electrically insulated from the anode.

The anode module 130 may include a means for stabilizing the anode arc root position. Referring to FIG. 19 an embodiment of a "stepped" anode module 140 is illustrated. The stepped anode module 140 may act to stabilize the arc root position downstream of the step, that is the stepped anode module 140 may limit the variation in the position where the arc contacts the anode. The anode may be provided having different profiles and may also serve as a forming module of the plasma device. Erosion of the anode, however, may result in changes of the dimensions of the anode plasma passage. Such changes in the dimensions of the anode plasma passage may result in related changes of the plasma parameters. According to an embodiment herein, a forming module of the plasma device may be provided that is electrically insulated from the anode. Electrically isolating the forming module from the anode may have an advantageous effect on the stability of parameters of a plasma jet exiting the forming module, by reducing the impact of anode erosion on the dimensions of the plasma passage. An embodiment of an electrically insulated forming module 142 coupled to a "stepped" anode 140 is illustrated by FIG. 20. In the illustrated embodiment, the exit of the forming module 142 may be connected with a barrel discussed herein above. Similar to the previous description, the forming module 142 may include a converging zone 144 leading to a throat 146 that may open to an expansion zone 148.

Figure 21:
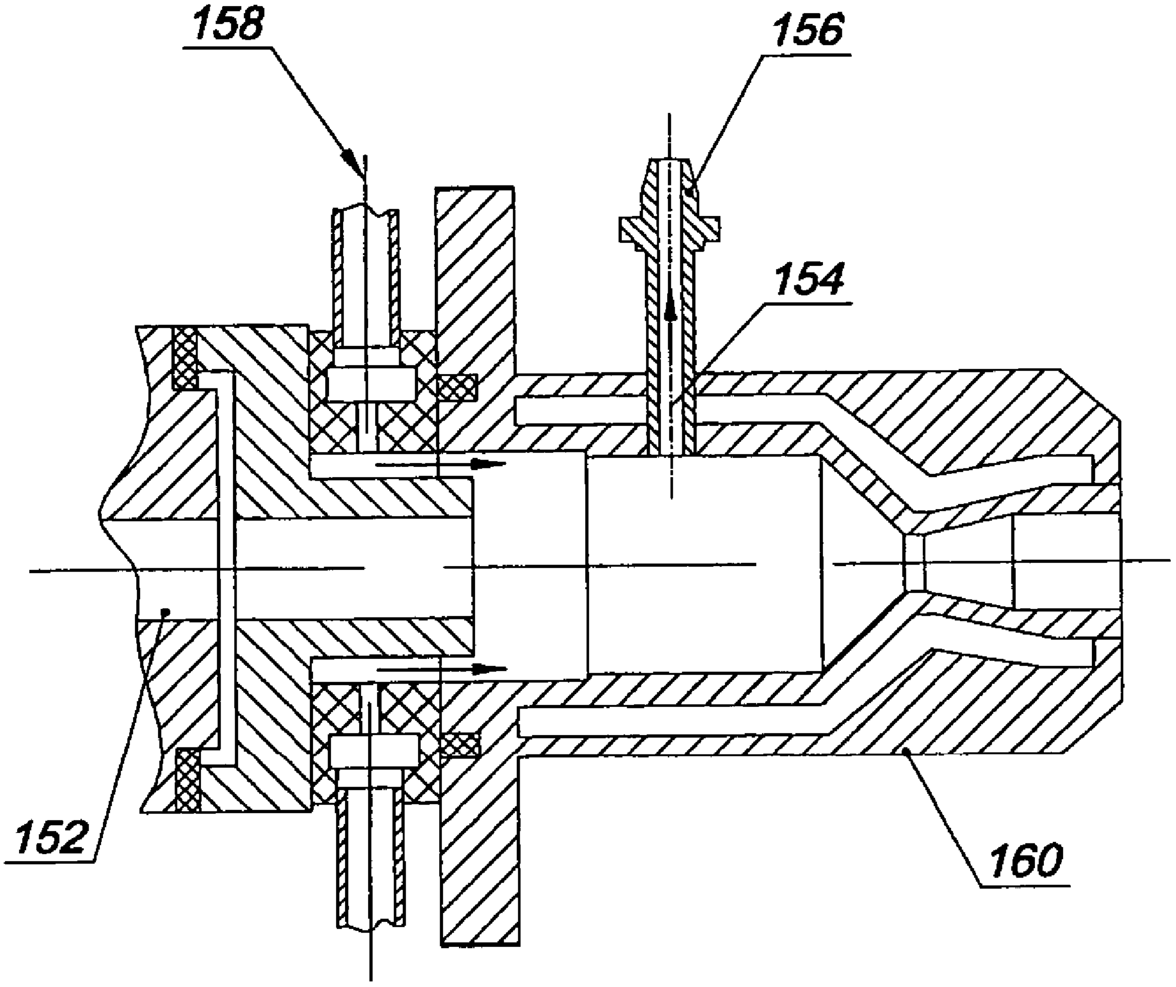
FIG. 21 illustrates an embodiment of a mixing chamber and a secondary forming module of plasma torch.
Figure 22:
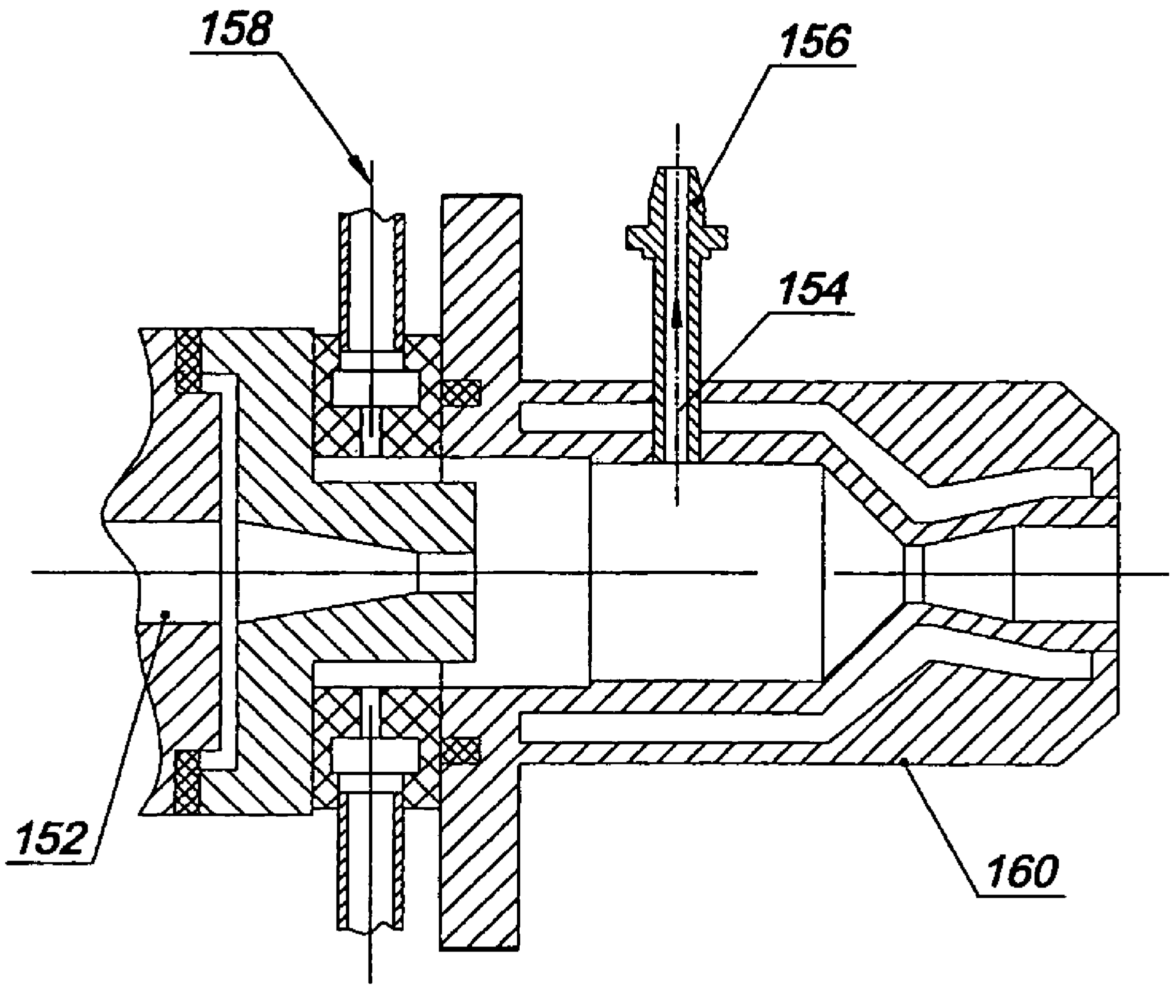
FIG. 22 illustrates an embodiment of a converging forming module that may be attached to a plasma torch and a mixing chamber including a secondary forming module.

Some low melting point materials, e.g. coating powders, may require a lower gas temperature than is provided by the plasma torch. FIGS. 21 and 22 illustrates embodiments of a plasma device including a mixing chamber 160. The mixing chamber 160 may include a downstream forming module that may be used to decrease the temperature of plasma jet generated by the cascade plasma torch. The mixing chamber 160 may be directly, or indirectly, coupled to the anode module 130 or to the forming module 142. The mixing chamber 160 may include one or more passages 158 that may be coupled to a source of a cold pressurized gas. Suitable cold pressurized gases may include nitrogen, helium, argon, air and their mixtures, as well as various other gases. The mixing chamber 160 may also include at least one passage 154 that may be connected to a pressure sensor (not shown) which may be provided as part of a feedback circuit that may be used to control the pressure in the mixing chamber 160. A plasma jet may exit plasma channel 152 and may be mixed together with cold gases supplied through the passages 158. Mixing of the gases may provide a desired temperature of gases exiting the forming module of the mixing chamber 160.

Referring back to FIG. 17, a magnified image of a WC-12Co coating sprayed using an HVST apparatus consistent with one of the embodiments described herein is illustrated. Microhardness testing was performed on the cross-sections with a Vickers microhardness tester using a load of 300 grams ($HV_{0.3}$). The coating exhibited a microhardness $HV_{0.3}$ measured on three sample coupons in the range of between about 1390 to about 1520 utilizing 10 indentations for each average microhardness value. While not intending to be bound to any particular theory, it is believed that the measured microhardness values may be attributed to a very high coating density, i.e., a coating having a minimum of voids, and minimized amount of defects in the coating sprayed by HVST apparatus.

What is claimed is:

1. A thermal spray apparatus comprising:

a heating module for providing a stream of heated gas;

a forming module coupled to said stream of heated gas, said forming module comprising a first zone having an entrance coupled to said stream of heated gas and an exit coupled to a throat having a constant cross-sectional area, and a second zone having an entrance coupled to said throat and an exit;

a barrel coupled to said exit of said forming module;

a powder injection module comprising at least one powder injector for introducing powder material into said stream of gas; and a shockwave generator;

where the ratio between the cross-sectional area of the exit of the second zone and the cross-sectional area of the throat $=(0.5 \text{ to } 0.8)^2-(1.7+0.1\ Pcc/Pa)^2$, wherein Pcc is absolute pressure in the heating module, and Pa is atmospheric pressure.

2. A thermal spray apparatus according to claim 1, wherein said shockwave generator is disposed between said forming module and said barrel.

3. A thermal spray apparatus according to claim 2, wherein said shockwave generator comprises a step defined between said forming module and said barrel, and wherein a cross-sectional area of said barrel is greater than a cross-sectional area of said forming module exit.

4. A thermal spray apparatus according to claim 3 wherein said cross-sectional area of said barrel is between about 1.05 to about 1.7 times greater than said cross-sectional area of said forming module exit.

5. A thermal spray apparatus according to claim 1, wherein a portion of said barrel adjacent said forming module defines a converging zone having a cross-sectional area adjacent said forming module that is greater than a cross-sectional area away from said forming module.

6. A thermal spray apparatus according to claim 5 wherein the length of said converging zone is between about 0.25 to about 2 times the diameter of the said exit of the forming module.

7. A thermal spray apparatus according to claim 5, wherein said barrel comprises a generally cylindrical region between said forming module and said converging zone.

8. A thermal spray apparatus according to claim 7, wherein the length of said generally cylindrical region is between about 0.25 to about 1.25 times the diameter of the said exit of the forming module.

9. A thermal spray apparatus according to claim 1, wherein said barrel comprises a second shockwave generator.

10. A thermal spray apparatus according to claim 9, wherein said second shockwave generator comprising a stepped region having a downstream cross-sectional area greater than an upstream cross-sectional.

11. A thermal spray apparatus according to claim 10, wherein said diameter of said downstream region is between about 1.02 to about 1.3 times greater than said diameter of said upstream region.

12. A thermal spray apparatus according to claim 10, wherein said step is disposed between about 0.05 to about 0.25 times a length of said barrel from an end of said barrel.

13. A thermal spray apparatus according to claim 1, wherein said barrel comprises an expansion zone, said expansion zone comprising an exit diameter in the range of between about 1.02 to about 1.3 time greater than an entrance diameter of said expansion zone.

14. A thermal spray apparatus according to claim 13, wherein the length of the barrel expansion zone is in the range of between about 0.05 to about 0.25 of total length of the barrel.

15. A thermal spray apparatus according to claim 1, wherein said at least one powder injector is oriented radial to said stream of gas.

16. A thermal spray apparatus according to claim 1, wherein said at least one powder injector is oriented parallel to said stream of gas.

17. A thermal spray apparatus according to claim 1, wherein said gas stream adjacent to said at least one powder injection has a pressure in the range of between about 0.04 to 0.08 MPa.

18. A thermal spray apparatus according to claim 1, wherein the at least one powder injector is disposed adjacent to said shockwave generator.

19. A thermal spray apparatus according to claim 1, wherein said entrance of said first zone has a greater cross-sectional area than said exit of said first zone.

20. A thermal spray apparatus according to claim 1, wherein said forming module further comprises a generally cylindrical region disposed between said exit of said second zone and an exit of said forming module.

21. A thermal spray apparatus according to claim 20 wherein said cylindrical region comprises a length in the range of between about 0.25 to about 2 times the diameter of said exit of said expansion zone.

22. A thermal spray apparatus according to claim 1, wherein said barrel comprises an inner sleeve and an outer sleeve, said inner sleeve having a thermal conductivity that is higher than a thermal conductivity of said outer sleeve.

23. A thermal spray apparatus according to claim 22, wherein said inner sleeve comprises copper and said outer sleeve comprises stainless steel.

24. A thermal spray apparatus according to claim 1, wherein said heating module comprises a combustion module.

25. A thermal spray apparatus according to claim 24, further comprising a secondary combustion region comprising a fuel supply and an oxidizer supply.

26. A thermal spray apparatus according to claim 25, wherein said secondary combustion region is disposed at least partially around said barrel.

27. A thermal spray apparatus according to claim 26, further comprising a secondary barrel disposed at least partially downstream of said secondary combustion region.

28. A thermal spray apparatus according to claim 1, wherein said heating module comprises a plasma torch.

29. A thermal spray apparatus according to claim 1, wherein said heating module comprises a resistive heating module.

30. A thermal spray apparatus according to claim 1, wherein said powder injection module is configured to introduce a mixture of powder and shot peening media.

31. A thermal spray apparatus according to claim 1, further comprising an injection nozzle for introducing shot peening media in to said stream of gas.

32. A thermal spray apparatus comprising:

a forming module comprising at least two sub-forming blocks, each sub-forming block coupled to a gas stream and each sub-forming block comprising a converging zone having an inlet diameter that is greater than an exit diameter, a throat having a constant cross-sectional area, and an expansion zone having an exit diameter that is greater than an inlet diameter;

a barrel coupled to an exit of each sub-forming block; and a shockwave generator;

where the ratio between the cross-sectional area of said exit of said expansion zone and the cross-sectional area of the throat $=(0.5 \text{ to } 0.8)^2-(1.7+0.1\ Pcc/Pa)^2$, wherein Pcc is absolute pressure in a heating module configured to provide said gas stream, and Pa is atmospheric pressure.

33. A thermal spray apparatus according to claim 32, wherein a cross-sectional area of said barrel is greater than a cumulative cross-sectional area of said exits of said sub-forming blocks.

34. A thermal spray apparatus according to claim 33, wherein said cross-sectional area of said barrel is between about 1.05 to about 1.7 times greater than said cumulative cross-sectional area of said exits of said sub-forming blocks.

35. A thermal spray apparatus according to claim 33, further comprising a powder injector introducing powder material into said gas stream.

36. A thermal spray apparatus comprising:

a forming module coupled to a stream of gas, said forming module comprising a converging zone having an entrance and an exit, said entrance having a greater cross-sectional area than said exit; a throat having a constant cross-sectional area, said throat coupled to said exit of said converging zone; and an expansion zone having an entrance and an exit, said entrance having a cross-sectional area smaller than a cross-sectional area of said exit, said entrance of said expansion zone coupled to said throat;

a powder injector introducing a powder material into said stream of gas, said powder injector oriented parallel to an axis of said forming module and disposed at least partially within said forming module, said powder injector having a cross-sectional profile that at least partially defines said cross-sectional areas of at least one of said converging zone, said throat, or said expansion zone; and a shockwave generator;

where the ratio between the cross-sectional area of said exit of said expansion zone and the cross-sectional area of the throat $=(0.5 \text{ to } 0.8)^2-(1.7+0.1\ Pcc/Pa)^2$, wherein Pcc is absolute pressure in a heating module configured to provide said gas stream, and Pa is atmospheric pressure.

37. A thermal spray apparatus according to claim 36, further comprising at least one passage introducing a gas for influencing a temperature of said gas stream.

38. A thermal spray apparatus according to claim 37, wherein said gas comprises a non-combustible gas.

39. A thermal spray apparatus according to claim 37, wherein said gas comprises a combustible gas.

* * * * *

UNITED STATES PATENT AND TRADEMARK OFFICE

CERTIFICATE OF CORRECTION

PATENT NO. : 7,608,797 B2
APPLICATION NO. : 11/158314
DATED : October 27, 2009
INVENTOR(S) : Vladimir Belashchenko It is certified that error appears in the above-identified patent and that said Letters Patent is hereby corrected as shown below:

In column 20, line 8, in claim 1, delete "$=(0.5 \text{ to } 0.8)^2-(1.7+0.1\ Pcc/Pa)^2$," and insert -- $=(0.5 \text{ to } 0.8)^2(1.7+0.1\ Pcc/Pa)^2$, --, therefor.

In column 22, line 7, in claim 32, delete "$=(0.5 \text{ to } 0.8)^2-(1.7+0.1\ Pcc/Pa)^2$," and insert -- $=(0.5 \text{ to } 0.8)^2(1.7+0.1\ Pcc/Pa)^2$, --, therefor.

In column 22, line 43, in claim 36, delete "$=(0.5 \text{ to } 0.8)^2-(1.7+0.1\ Pcc/Pa)^2$," and insert -- $=(0.5 \text{ to } 0.8)^2(1.7+0.1\ Pcc/Pa)^2$, --, therefor.

Signed and Sealed this
First Day of February, 2011

David J. Kappos

David J. Kappos
*Director of the United States Patent and Trademark Office*